United States Patent [19]

Tsutsui et al.

[11] Patent Number: 5,543,377
[45] Date of Patent: Aug. 6, 1996

[54] OLEFIN POLYMERIZATION CATALYSTS AND METHODS OF OLEFIN POLYMERIZATION

[75] Inventors: Toshiyuki Tsutsui; Ken Yoshitsugu, both of Waki-cho, Japan

[73] Assignee: Mitsui Petrochemical Industries Co., Ltd., Tokyo, Japan

[21] Appl. No.: 456,805

[22] Filed: Jun. 1, 1995

Related U.S. Application Data

[62] Division of Ser. No. 287,799, Aug. 9, 1994.

[30] Foreign Application Priority Data

Aug. 10, 1993 [JP] Japan .................................. 5-198609
Aug. 10, 1993 [JP] Japan .................................. 5-198610

[51] Int. Cl.$^6$ ........................... C08F 4/649; C08F 10/00
[52] U.S. Cl. ........................ 502/125; 502/120; 502/111
[58] Field of Search ............................ 526/142; 502/125

[56] References Cited

U.S. PATENT DOCUMENTS

| | | | |
|---|---|---|---|
| 3,210,332 | 10/1965 | Lyons et al. | 526/142 |
| 4,536,484 | 8/1985 | Lacombe et al. | |
| 4,542,199 | 9/1985 | Kaminsky et al. | |
| 4,769,510 | 9/1988 | Kaminsky et al. | |
| 4,808,561 | 2/1989 | Welborn, Jr. et al. | |
| 4,990,640 | 2/1991 | Tsutsui et al. | |
| 5,145,818 | 9/1992 | Tsutsui et al. | |
| 5,329,032 | 7/1994 | Tran et al. | 526/142 |
| 5,374,700 | 12/1994 | Tsutsui et al. | 526/129 |
| 5,385,877 | 1/1995 | Fujita et al. | 526/160 |

FOREIGN PATENT DOCUMENTS

| | | |
|---|---|---|
| 0128045 | 12/1984 | European Pat. Off. . |
| 0128046 | 12/1984 | European Pat. Off. . |
| 0129368 | 12/1984 | European Pat. Off. . |
| 0351392 | 1/1990 | European Pat. Off. . |
| 0472741 | 3/1992 | European Pat. Off. . |
| 0492523 | 7/1992 | European Pat. Off. . |
| 0513380 | 11/1992 | European Pat. Off. . |
| 1598869 | 8/1970 | France . |
| 60-130604 | 7/1985 | Japan . |
| 60-260602 | 12/1985 | Japan . |
| 61-108610 | 5/1986 | Japan . |
| 5178926 | 7/1993 | Japan . |

OTHER PUBLICATIONS

*Abstract from "Patent Abstracts of Japan" furnished.

Patent Abstracts of Japan, vol. 17, No. 594 (C–1126), Oct. 29, 1993 Abstract of Japanese L–O–P No. 05–178 926 (Jul. 20, 1993).

*Primary Examiner*—Edward J. Smith
*Attorney, Agent, or Firm*—Sherman and Shalloway

[57] ABSTRACT

An olefin polymerization catalyst of the present invention comprises (A) a metallocene compound, (B) an organoaluminum oxy compound, and (C) at least one kind of carbonyl-containing compound selected from ketoalcohol and β-diketone, and optionally (D) an organoaluminum compound, and therefore, the catalyst is excellent in polymerization activity per catalyst unit weight, and is capable of giving olefin (co)polymers having high molecular weight.

A supported olefin polymerization catalyst and its olefin prepolymerized catalyst of the present invention are excellent in polymerization activity per catalyst unit weight, and is capable of giving olefin (co)polymers having uniform particle size.

10 Claims, 2 Drawing Sheets

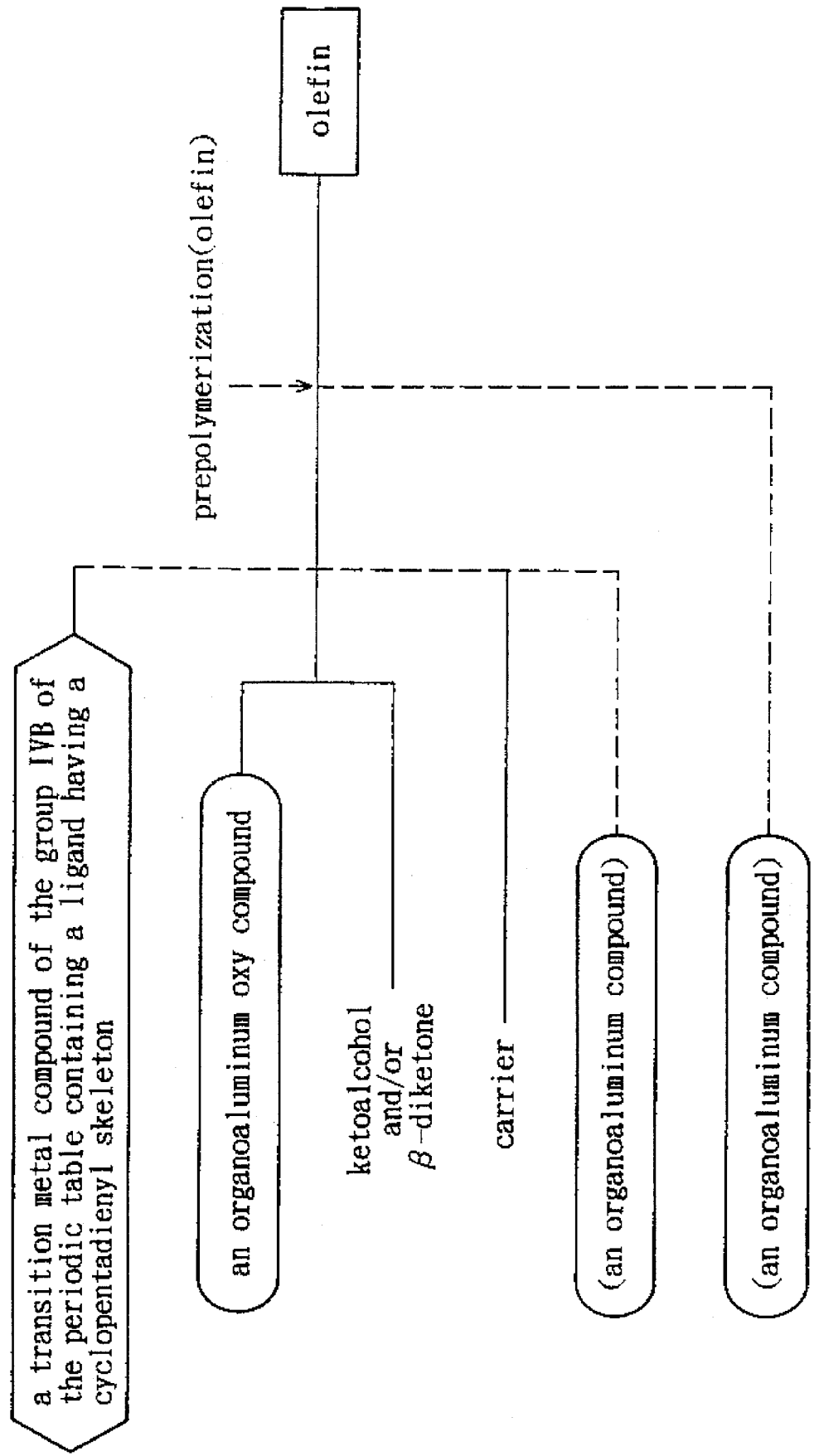

OLEFIN POLYMERIZATION CATALYSTS AND METHODS OF OLEFIN POLYMERIZATION

This is a division of application Ser. No. 08/287,799 filed Aug. 9, 1994.

FIELD OF THE INVENTION

This invention relates to olefin polymerization catalysts, and more particularly the invention relates to olefin polymerization catalysts having excellent polymerization activity per catalyst unit weight, and capable of giving olefin (co)polymers having high molecular weight, and to methods of olefin polymerization using the same. The invention relates further to olefin polymerization catalysts supported on a carrier (hereinafter referred to supported olefin polymerization catalysts), and more particularly, this invention relates to supported olefin polymerization catalysts excellent in polymerization activity per catalyst unit weight and capable of giving (co)polymers uniform in particle size, supported olefin polymerization catalysts in which olefin is prepolymerized on this supported catalyst component, and to methods of olefin polymerization using the same.

BACKGROUND OF THE INVENTION

As catalysts used for preparing olefin polymers, e.g. ethylene homopolymer or ethylene/olefin copolymers, there have heretofore been known such titanium-containing catalysts comprising titanium compounds and organoaluminum compounds or vanadium-containing catalysts comprising vanadium compounds and organoaluminum compounds.

Further, as catalysts capable of preparing ethylene/olefin copolymers with high polymerization activity, there have been known olefin polymerization catalysts comprising zirconium compounds and organoaluminum oxy compounds (aluminoxane), and methods for preparing ethylene/olefin copolymer using such catalysts have been proposed, for example, in Japanese Patent L-O-P Publications Nos. 19309/1983, 35005/1985, 35006/1985, 35007/1985, 35008/1985, etc.

Furthermore, Japanese Patent L-O-P Publications No. 260602/1985 and 130604/1985 propose methods for polymerization of olefin using catalysts formed from transition metal compounds and mixed organoaluminum compounds comprising aluminoxane and organoaluminum compounds.

Where it is intended to produce polyolefins having a high molecular weight by using the conventional catalysts as aforesaid, there is proposed a method therefor in which the polymerization is carried out at a relatively low temperature. When the polyolefins high in molecular weight are prepared by such a method just mentioned above, however, it was difficult to prepare polyolefins having high molecular weight with high polymerization activity, because catalyst activity decreases markedly.

As the result of extensive researches conducted by the present inventors in view of the foregoing prior art, they have found that catalysts comprising (A) transition metal compound of the group IVB of the periodic table having a cyclopentadienyl skeleton, (B) organoaluminum oxy compound, (C) at least one kind of carbonyl-containing compound selected from ketoalcohol and β-diketone and, if necessary, (D) organoaluminum compound are capable of polymerizing polyolefin high in molecular weight with high activity, and finally the present invention has been accomplished on the basis of the above findings.

Further, the catalysts formed from transition metal compounds and aluminoxanes as prepared in the foregoing Japanese patent publications are excellent in polymerization activity, particularly polymerization activity on ethylene in comparison with the prior art catalysts formed from transition metal compounds and organoaluminum compounds. However, because the greater part of the proposed catalysts are soluble in reaction system, the application of said catalysts is limited to preparation of polymers by solution polymerization in most cases, and when polymers high in molecular weight are intended to prepare by using said catalysts, there is brought about such an inconvenience that the solution containing the resulting polymer becomes markedly high in viscosity, whereby the productivity of the intended polymer decreases.

For the purpose of solving such a problem as mentioned above, methods for polymerizing olefins in the suspension or vapor phase polymerization system using catalysts formed from transition metal compound and organoaluminum oxy compound have been proposed, for example, in the foregoing Japanese Patent L-O-P Publications Nos. 35006/1985, 35007/1985 and 35008/1985, wherein at least one of the two catalyst components of said catalysts has been supported on a porous inorganic carrier such as silica, alumina or silica-alumina.

Further, the foregoing Japanese Patent L-O-P Publns. and Japanese Patent L-O-P Publns. Nos. 130314/1986 and 41303/1990 disclose that catalysts systems comprising a combination of metallocene compounds of transition metal compounds having pentadienyl group as ligand such as cyclopentadienyl group, alkyl group and/or halogen atom and aluminoxane exhibit high activity in α-olefin polymerization, and the polymers obtained thereby are excellent in properties.

Furthermore, Japanese Patent L-O-P Publns. Nos. 108610/1986 and 296008/1986 disclose methods for carrying out olefin polymerization in the presence of catalysts formed from transition metal compounds such as metallocene and aluminoxane, both being supported on a carrier such as inorganic oxide.

However, when olefins are polymerized or copolymerized in the suspension or vapor phase polymerization system using the solid catalyst components supported on the carrier as disclosed in the foregoing patent publications, the polymerization activity expected thereby decreases markedly in comparison with the case of the foregoing solution polymerization system, and no satisfactory result was obtained.

The present inventors conducted extensive researches in view of the prior art as mentioned above, and as a result they have found that supported catalysts formed by supporting catalyst component (A) transition metal compounds of the group IVB of the periodic table containing ligands having a cyclopentadienyl skeleton, (B) organoaluminum oxy compounds and (C) at least one kind of carbonyl-containing compound selected from ketoalcohol and β-diketone and, if necessary, (D) organoaluminum compound, on a solid carrier are excellent in polymerization activity per catalyst unit weight and also are capable of preparing polymers uniform in particle size (there are contained in the resulting polymers few fine powdery polymers), and they have finally accomplished the present invention on the basis of the above finding.

OBJECT OF THE INVENTION

The present invention has been made under such circumstances as aforesaid, and its object is to provide olefin polymerization catalysts excellent in polymerization activity per catalyst unit weight and capable of giving olefin polymers high in molecular weight, and methods for the polymerization of olefin using the same.

A further object of the invention is to provide supported olefin polymerization catalysts excellent in polymerization activity per catalyst unit weight and capable of giving (co)polymers uniform in particle size, supported olefin polymerization catalysts in which olefin has been prepolymerized on the supported olefin polymerization catalysts, and methods for the polymerization of olefin using these catalysts.

SUMMARY OF THE INVENTION

The first olefin polymerization catalyst of the present invention comprises (A) a transition metal compound of the group IVB of the periodic table containing a ligand having a cyclopentadienyl skeleton, (B) an organoaluminum oxy compound, and (C) at least one kind of carbonyl-containing compound selected from ketoalcohol and β-diketone.

The second olefin polymerization catalyst of the invention comprises (A) a transition metal compound of the group IVB of the periodic table containing a ligand having a cyclopentadienyl skeleton, (B) an organoaluminum oxy compound, (C) at least one kind off carbonyl-containing compound selected from ketoalcohol and β-diketone, and (D) an organoaluminum compound.

The third olefin polymerization catalyst of the invention comprises a solid carrier, (A) a transition metal compound of the group IVB of the periodic table containing a ligand having a cyclopentadienyl skeleton, (B) an organoaluminum oxy compound, and (C) at least one kind of carbonyl-containing compound selected from ketoalcohol and β-diketone, wherein the components (A), (B) and (C) are supported on the solid carrier.

The fourth olefin polymerization catalyst of the invention comprises a solid carrier, (A) a transition metal compound of the group IVB of the periodic table containing a ligand having a cyclopentadienyl skeleton, (B) an organoaluminum oxy compound, (C) at least one kind of carbonyl-containing compound selected from ketoalcohol and 1β-diketone, and (D) an organoaluminum compound, wherein the components (A), (B), (C) and (D) are supported on the solid carrier.

The fifth olefin polymerization catalyst of the invention comprises [I-1] a solid catalyst comprising a solid carrier, (A) a transition metal compound of the group IVB of the periodic table containing a ligand having a cyclopentadienyl skeleton, (B) an organoaluminum oxy compound, and (C) at least one kind of carbonyl-containing compound selected from ketoalcohol and β-diketone, wherein the components (A), (B) and (C) are supported on the solid carrier; and

[II] (E) an organoaluminum compound.

The sixth olefin polymerization catalyst of the invention comprises

[I-2] a solid catalyst comprising a solid carrier, (A) a transition metal compound of the group IVB of the periodic table containing a ligand having a cyclopentadienyl skeleton, (B) an organoaluminum oxy compound, (C) at least one kind of carbonyl-containing compound selected from ketoalcohol and β-diketone, and (D) an organoaluminum compound, wherein the components (A), (B), (C) and (D) are supported on the solid carrier; and

[II] (E) an organoaluminum compound.

The seventh olefin polymerization catalyst of the invention comprises: a solid catalyst comprising a solid carrier, (A) a transition metal compound of the group IVB of the periodic table containing a ligand having a cyclopentadienyl skeleton, (B) an organoaluminum oxy compound, and (C) at least one kind of carbonyl-containing compound selected from ketoalcohol and β-diketone, wherein the components (A), (B) and (C) are supported on the solid carrier; and a prepolymerized olefin polymer.

The eighth olefin polymerization catalyst of the invention comprises: a solid catalyst comprising a solid carrier, (A) a transition metal compound of the group IVB of the periodic table containing a ligand having a cyclopentadienyl skeleton, (B) an organoaluminum oxy compound, (C) at least one kind of carbonyl-containing compound selected from ketoalcohol and β-diketone, and (D) an organoaluminum compound, wherein the components (A), (B), (C) and (D) are supported on the solid carrier; and a prepolymerized olefin polymer.

The ninth olefin polymerization catalyst of the invention comprises: [I'-1] a solid catalyst comprising a solid carrier, (A) a transition metal compound of the group IVB of the periodic table containing a ligand having a cyclopentadienyl skeleton, (B) an organoaluminum oxy compound, and (C) at least one kind of carbonyl-containing compound selected from ketoalcohol and β-diketone, wherein the components (A), (B), and (C) are supported on the solid carrier, and a prepolymerized olefin polymer; and [II] (E) an organoaluminum compound.

The tenth olefin polymerization catalyst of the invention comprises [I-2'] a solid catalyst comprising a solid carrier, (A) a transition metal compound of the group IVB of the periodic table containing a ligand having a cyclopentadienyl skeleton, (B) an organoaluminum oxy compound, (C) at least one kind of carbonyl-containing compound selected from ketoalcohol and β-diketone, and (D) an organoaluminum compound, wherein the components (A), (B), (C) and (D) are supported on the solid carrier, and a prepolymerized olefin polymer; and [II] (E) an organoaluminum compound.

The method for the polymerization of olefins according to the present invention comprises polymerizing or copolymerizing olefins in the presence of such olefin polymerization catalysts as illustrated hereinbefore.

BRIEF DESCRIPTION OF THE DRAWINGS

FIG. 2 is a drawing that illustrates a preparative process of the supported olefin polymerization catalyst of the invention.

DETAILED DESCRIPTION OF THE INVENTION

Figure 1:
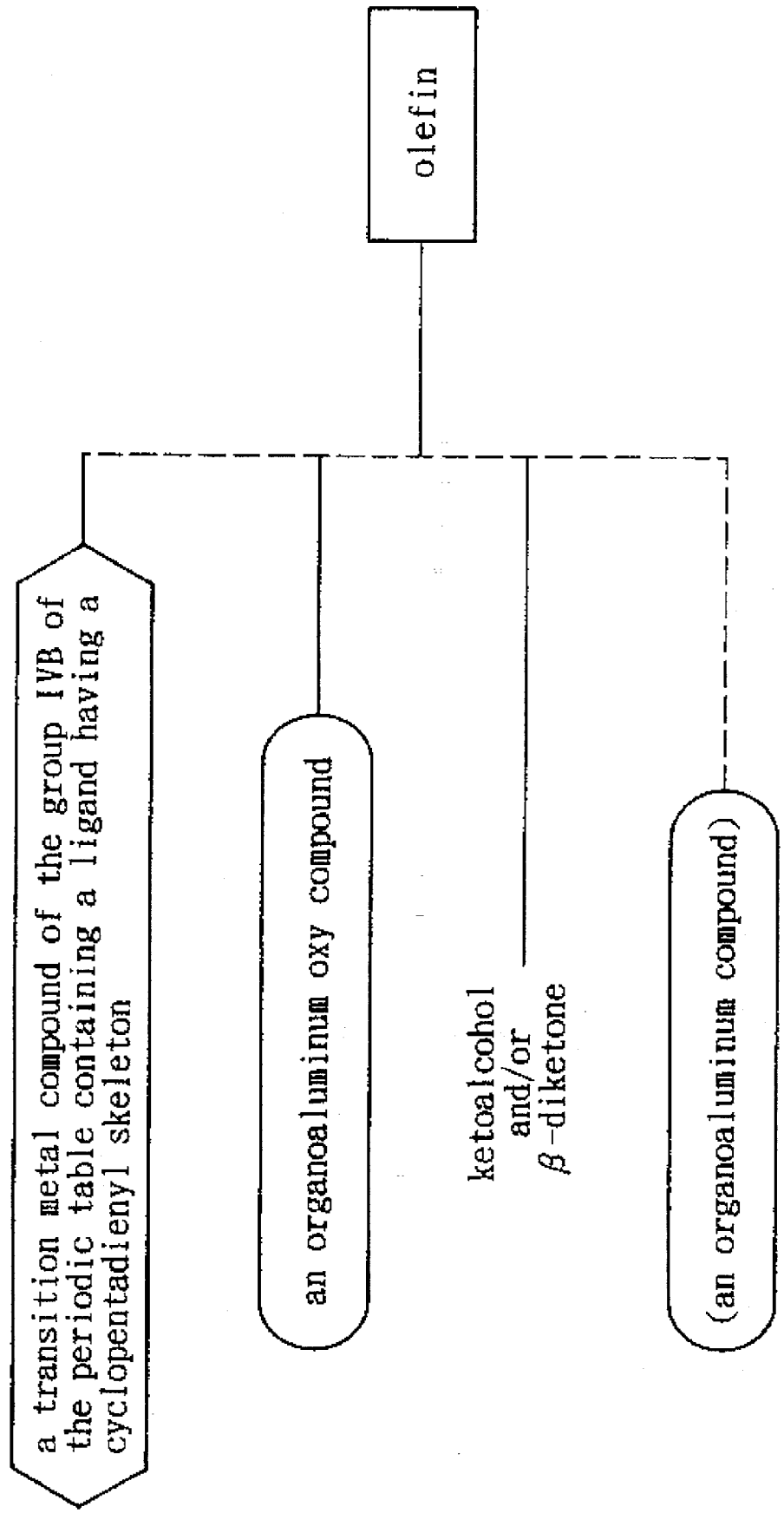
FIG. 1 is a drawing that illustrates a preparative process of the olefin polymerization catalysts of the present invention.

The olefin polymerization catalysts, the supported olefin polymerization catalysts and methods for the polymerization of olefins using these olefin polymerization catalysts according to the present invention will be described in detail hereinafter.

The term "polymerization" used in the invention sometimes means "homopolymerization" as well as "copolymerization", and the term "polymer" used in the invention sometimes means "homopolymer" as well as "copolymer".

First, the catalyst components used in the olefin polymerization catalysts of the present invention are described below.

The transition metal compound (A) of the group IVB of the periodic table containing a ligand having a cyclopentadienyl skeleton [hereinafter, sometimes referred to as "component (A)"] is a transition metal compound represented by the following general formula (I).

$$ML_x \qquad (I)$$

wherein M is a transition metal atom selected from the group IVB of the periodic table, L is a ligand coordinating to the transition metal, at least one of L is a ligand having a cyclopentadienyl skeleton, and L other than the ligand having a cyclopentadienyl skeleton is a hydrocarbon group of 1–12 carbon atoms, an alkoxy group, an aryloxy group, a trialkylsilyl group, $SO_3R^1$ group (provided that $R^1$ is a hydrocarbon group of 1–8 carbon atoms which may have such a substituent as halogen), halogen atom or hydrogen atom, and x is a valence of the transition metal atom.

In the above general formula (I), M is a transition metal atom selected from the group IVB of the periodic table, concretely zirconium atom, titanium atom or hafnium atom, preferably zirconium atom.

The ligands having a cyclopentadienyl skeleton are, for example, cyclopentadienyl group; alkyl-substituted cyclopentadienyl groups such as methylcyclopentadienyl, dimethylcyclopentadienyl, trimethylcyclopentadienyl, tetramethylcyclopentadienyl, pentamethylcyclopentadienyl, ethylcyclopentadienyl, methylethylcyclopentadienyl, propylcyclopentadienyl, methylpropylcyclopentadienyl, butylcyclopentadienyl, methylbutylcyclopentadienyl and hexylcyclopentadienyl; indenyl group; 4,5,6,7-tetrahydroindenyl group; alkyl-substituted indenyl groups such as 2-methylindenyl, 2-methyl-4-phenylindenyl, 4-isopropyl-2,7-dimethylindenyl; and fluorenyl group. These groups as exemplified above may be substituted with a halogen atom or trialkylsilyl group.

Of the ligands coordinating with the transition metal atom, particularly preferred are alkyl-substituted cyclopentadienyl groups and an indenyl group.

When the compound represented by the formula (I) contains two or more ligands each having a cyclopentadienyl skeleton, the two ligands having a cyclopentadienyl skeleton may be linked together through an alkylene group such as ethylene or propylene, a substituted alkylene group such as isopropylidene or diphenylmethylene, a silylene group or a substituted silylene group such as dimethylsilylene, diphenylsilylene or methylphenylsilylene.

The ligands L other than those having a cyclopentadienyl skeleton may include those mentioned below.

The hydrocarbon group of 1–12 carbon atoms includes such group as alkyl, cycloalkyl, aryl or aralkyl, and more particularly, the alkyl group includes methyl, ethyl, propyl, isopropyl or butyl;

the cycloalkyl group includes cyclopentyl or cyclohexyl;

the aryl group includes phenyl or tolyl; and the aralkyl group includes benzyl or neophyl.

Further, the alkoxy group includes methoxy, ethoxy or butoxy;

aryloxy group includes phenoxy;

the halogen includes fluorine, chlorine, bromine or iodine; and the ligand represented by $SO_3R^1$ includes p-toluenesulfonate, methanesulfonate or trifluoromethanesulfonate.

When the valence of the transition metal atom is, for example, 4, the transition metal compound is represented by the following general formula (Ia) in more detail.

$$R^2{}_k R^3{}_l R^4{}_m R^5{}_n M \qquad (Ia)$$

wherein M represents the aforementioned transition metal atom, $R^2$ represents a group (ligand) having a cyclopentadienyl skeleton, $R^3$, $R^4$ and $R^5$ each represent a group having a cyclopentadienyl skeleton, alkyl group, cycloalkyl group, aryl group, aralkyl group, alkoxyl group, aryloxy group, trialkylsilyl group, $SO_3R^1$ group, halogen atom or hydrogen atom, k is an integer of 1 or more, and $k+l+m+n=4$.

In the present invention, there is used preferably a metallocene compound having the above-mentioned formula (Ia) in which at least one of $R^3$, $R^4$ and $R^5$ is the group (ligand) having a cyclopentadienyl skeleton. For example, $R^2$ and $R^3$ are the groups (ligands) having a cyclopentadienyl. When the compound of formula (Ia) contains at least two groups (ligands) having a cyclopentadienyl skeleton, two of these may be linked together through an alkylene group such as ethylene or propylene, a substituted alkylene group such as isopropylene or diphenylmethylene, a silylene group or a substituted silylene group such as dimethylsilylene, diphenylsilylene or methylphenylsilylene. Further, when $R^2$ and $R^3$ are the groups (ligands) having a cyclopentadienyl skeleton, $R^4$ and $R^5$ are each a group having a cyclopentadienyl skeleton, alkyl group, cycloalkyl group, aryl group, aralkyl group, alkoxyl group, aryloxy group, trialkylsilyl group, $SO_3R^1$ group, halogen atom or hydrogen atom.

Exemplified below are the transition metal compounds wherein M is zirconium.

Bis (indenyl) zirconlure dichloride,
Bis (indenyl) zirconium dibromide,
Bis (indenyl) zirconium his (p-toluenesulfonate),
Bis (4,5,6,7-tetrahydroindenyl) zirconlure dichloride,
Bis (fluorenyl) zirconlure dichloride, Ethylenebis (indenyl) zirconium dichloride,
Ethylenebis (indenyl) zirconium dibromide,
Ethylenebis (indenyl) dimethylzirconium,
Ethylenebis (indenyl) diphenylzirconium,
Ethylenebis (indenyl) methylzirconium monochloride,
Ethylenebis (indenyl) zirconium bis(methanesulfonate),
Ethylenebis (indenyl) zirconium bis(p-toluenesulfonate),
Ethylenebis (indenyl) zirconium bis(trifluoromethanesulfonate),
Ethylenebis (4,5,6,7-tetrahydroindenyl) zirconium dichloride,
Isopropylidene (cyclopentadienyl-fluorenyl) zirconium dichloride,
Isopropylidene (cyclopentadienyl-methylcyclopentadienyl) zirconium dichloride,
Dimethylsilylene bis (cyclopentadienyl) zirconium dichloride,
Dimethylsilylene bis (methylcyclopentadienyl) zirconium dichloride,
Dimethylsilylene bis (dimethylcyclopentadienyl) zirconium dichloride,
Dimethylsilylene bis (trimethylcyclopentadienyl) zirconium dichloride,
Dimethylsilyenebis (indenyl) zirconium dichloride,
Dimethylsilylene bis (2-methylindenyl) zirconium dichloride,
Dimethylsilylene bis (2-methyl-4-isopropylindenyl) zirconium dichloride,
Dimethylsilylene bis (indenyl) zirconium bis(trifluoromethane-sulfonate),
Dimethylsilylene bis (4,5,6,7-tetrahydroindenyl)zirconium dichloride,
Dimethylsilylene (cyclopentadienyl-fluorenyl)zirconium dichloride,
Diphenylsilylenebis (indenyl) zirconium dichloride,
Diphenylsilylenebis (2-methyl-4-isopropylindenyl)zirconium dichloride,
Methylphenylsilylenebis (indenyl)zirconium dichloride,
Bis (cyclopentadienyl) zirconium dichloride,
Bis (cyclopentadienyl) zirconium dibromide,
Bis (cyclopentadienyl) methylzirconium monochloride,
Bis (cyclopentadienyl) ethylzirconium monochloride,
Bis (cyclopentadienyl) cyclohexyzirconium monochloride,
Bis (cyclopentadienyl) phenylzirconium monochloride,
Bis(cyclopentadienyl)phenylzirconium monochloride,
Bis(cyclopentadienyl)benzylzirconium monochloride,
Bis(cyclopentadienyl)zirconium monochloride monohydride,
Bis(cyclopentadienyl)methylzirconium monohydride,
Bis(cyclopentadienyl)dimethylzirconium,
Bis(cyclopentadienyl)diphenylzirconium,
Bis(cyclopentadienyl)diphenylzirconium,
Bis(cyclopentadienyl)zirconium methoxychloride,
Bis(cyclopentadienyl)zirconium ethoxychloride,
Bis(cyclopentadienyl)zirconium bis(methanesulfonate),
Bis(cyclopentadienyl)zirconium his (p-toluenesulfonate),
Bis(cyclopentadienyl)zirconium bis(trifluoromethanesulfonate),
Bis(methylcyclopentadienyl)zirconium dichloride,
Bis(dimethylcyclopentadienyl)zirconium dichloride,
Bis(dimethylcyclopentadienyl)zirconium ethoxychloride,
Bis(dimethylcyclopentadienyl)zirconium bis(trifluoromethanesulfonate),
Bis(ethylcyclopentadienyl)zirconium dichloride,
Bis(methylethylcyclopentadienyl)zirconium dichloride,
Bis(propylcyclopentadienyl)zirconium dichloride,
Bis(methylpropylcyclopentadienyl)zirconium dichloride,
Bis(butylcyclopentadienyl)zirconium dichloride,
Bis(methylbutylcyclopentadienyl)zirconium dichloride,
Bis(methylbutylcyclopentadienyl)zirconium bis-(methanesulfonate),
Bis(trimethylcyclopentadienyl)zirconium dichloride,
Bis(tetramethylcyclopentadienyl)zirconium dichloride,
Bis(tetramethylcyclopentadienyl)zirconium dichloride,
Bis(hexylcyclopentadienyl)zirconium dichloride, and
Bis(trimethylsilylcyclopetnadienyl)zirconium dichloride.

In the compounds exemplified above, the di-substituted cyclopentadienyl ring includes 1,2- and 1,3-substituted compounds, arid the tri-substituted cyclopentadienyl ring includes 1,2,3- and 1,2, 4-substituted compounds. Further, the alkyl group such as propyl or butyl includes isomer such as n-, i-, sec-, tert-isomers.

In the present invention, the above-exemplified zirconium compounds in which the zirconium has been replaced by titanium or hafnium can also be used as the transition metal compounds.

The organoaluminum oxy-compound (B) used in the present invention [hereinafter, sometimes referred to as "component (B)"] may be a known aluminoxane or the benzene-insoluble organoaluminum oxy-compound disclosed in JP-A-2- 78687/1990.

The above-mentioned known aluminoxane may be prepared, for example, by the following procedures:

(1) a procedure for recovering an aluminoxane as its hydrocarbon solution which comprises adding an organoaluminum compound such as trialkylaluminum to a suspension in a hydrocarbon medium of a compound containing adsorbed water, or a salt containing water of crystallization such as magnesium chloride hydrate, copper sulfate hydrate, aluminum sulfate hydrate, nickel sulfate hydrate and cerium chloride hydrate, and reacting the organoaluminum compound;

(2) a procedure for recovering an aluminoxane as its hydrocarbon solution which comprises reacting water, ice or steam directly with an organoaluminum compound such as trialkylaluminum in a solvent such as benzene, toluene, ethyl ether and tetrahydrofuran; and (3) a procedure for recovering an aluminoxane which comprises reacting an organotinoxide such as dimethyltinoxide and dibutyltinoxide with an organoaluminum compound such as trialkylaluminum in a solvent such as decane, benzene or toluene.

In the above precedures, the aluminoxane is recovered in the form of solution of hydrocarbon. Furthermore, the solvent or unreacted organoaluminum compound may be removed from the above-mentioned recovered aluminoxane-containing solution, by distillation, and the aluminoxane may be redissolved in a solvent.

Concrete examples of the organoaluminum compound used for the preparation of the aluminoxane include
trialkylaluminum such as trimethylaluminum, triethylaluminum, tripropylaluminum, triisopropylaluminum, tri-n-butylaluminum, triisobutylaluminum, tri-secbutylaluminum, tri-tert-butylaluminum, tripentylaluminum, trihexylaluminum, trioctylaluminum and tridecylaluminum;

tricycloalkylaluminums such as tricyclohexylaluminum and tricyclooctylaluminum;

dialkylaluminum halides such as dimethylaluminum chloride, diethylaluminum chloride, diethylaluminum bromide and diisobutylaluminum chloride;

dialkylaluminum hydrides such as diethylaluminum hydride and diisobutylaluminum hydride;

dialkylaluminum alkoxides such as dimethylaluminum methoxide and diethylaluminum ethoxide; and dialkylaluminum aryloxides such as diethylaluminum phenoxide.

Of these compounds, trialkylaluminum and tricycloalkylaluminum are preferable.

Furthermore, there may also be used, as the organoaluminum compound, isoprenylaluminum represented by the following general formula (II);

$$(i\text{---}C_4H_9)_xAl_y(C_5H_{10})_z \qquad (II)$$

wherein x, y and z are each a positive number, and $z \geq 2x$.

The organoaluminum compounds mentioned above may be used either singly or in combination of two ore more.

Solvents used for the solutions of the aluminoxane include aromatic hydrocarbons such as benzene, toluene, xylene, cumene and cymene; aliphatic hydrocarbons such as pentane, hexane, heptane, octane, decane, dodecane, hexadecane and octadecane; alicyclic hydrocarbons such as cyclopentane, cyclohexane, cyclooctane and methylcyclopentane; petroleum fractions such as gasoline, kerosene and gas oil; and halogenated compounds derived from the above-mentioned aromatic hydrocarbons, aliphatic hydrocarbons and alicyclic hydrocarbons, especially chlorinated and brominated hydrocarbons. In addition, there may also be used ethers such as ethyl ether and tetrahydrofuran. Of these solvents as exemplified above, aromatic hydrocarbons are particularly preferred.

The benzene-insoluble organoaluminum oxy compound which may be used in the present invention can be obtained by a method comprising bringing a solution of aluminoxane into contact with water or an active-hydrogen containing compound, or a method comprising bringing the above mentioned organoaluminum compound into contact with water. The benzene-insoluble organoaluminum oxy-compounds (B) contain an Al component soluble in benzene at 60° C. in an amount of not greater than 10% preferably not greater than 5%, particularly preferably not greater than 2% in terms of Al atom, and they are insoluble or sparingly soluble in benzene.

The above mentioned organoaluminum oxy compound (B) is usually available of handled in the form of toluene solution.

The organoaluminum oxy compound (B) may contain small amount of organic compound of a metal other than aluminum.

The carbonyl-containing compound (C) used in the present invention is the following ketoalcohol and the following β-diketone.

The ketoalcohols used in the present invention include acetol, 1-hydroxy-2-butanone, 3-hydroxy-2-butanone, 3-acetyl-1-propanol, 3-hydroxy-3-methyl-2-butanone, 4-hydroxy-3-methyl-2-butanone and 4-hydroxy-4-methyl-2-pentanone.

The β-diketones used in the present invention include 2,4-pentanedione (acetylacetone), 2-methyl-1,3-butanedione, 1,3-butanedione, 3-phenyl-2,4-pentanedione, 1,1,1-trifluoro-2,4-pentanedione, 1,1,1-trifluoro-5,5-dimethyl-2,4-hexanedione, 2,2,6,6-tetramethyl-3,5-heptanedione, 3-methyl-2,4-pentanedione, 2-acetylcyclopentanone, 2-acetylcyclohexanone, 1-heptafluoropropyl-3-t-butyl-1,3-propanedione, 1,3-diphenyl-1,3-propanedione, 1,3-diphenyl-2-methyl-1,3-propanedione and 1-ethoxy-1,3-butanedione.

Of these, preferred are 2,4-pentanedione, 2-methyl-1,3-butanedione and 1,3-butanedione, and particularly preferred is 2,4-pentanedione.

These ketoalcohols and β-diketones are used either singly or in combination of two or more.

The organoaluminum compound (D) used in the present invention [hereinafter, sometimes referred to as "component (D)"] include an organoaluminum compound represented by the following general formula (III).

$$R^6{}_nAlX_{3-n} \qquad (III)$$

wherein $R^6$ is a hydrocarbon group of 1 to 12 carbon atoms, X is a halogen atom or a hydrogen atom, and n is 1 to 3.

In the above formula (III), $R^6$ is a hydrocarbon group of 1 to 12 carbon atoms, for example, an alkyl group, a cycloalkyl group or an aryl group. Concrete examples of $R^6$ include methyl, ethyl, n-propyl, isopropyl, n-butyl, isobutyl, pentyl, hexyl, isohexyl, heptyl, nonyl, octyl, cyclopentyl, cyclohexyl, phenol and tolyl.

Concrete examples of such organoaluminum compounds (D) include trialkylaluminum such as trimethylaluminum, triethylaluminum, triisopropylaluminum, triisobutylaluminum, trioctylaluminum and tri-2-ethylhexylaluminum;

alkenylaluminum such as isoprenylaluminum;

dialkylaluminum halides such as dimethylaluminum chloride, diethylaluminum chloride, diisopropylaluminum chloride, diisobutylaluminum chloride and dimethylaluminum bromide;

alkylaluminum sesquihalides such as methylaluminum sesquichloride, ethylaluminum sesquichloride, isopropylaluminum sesquichloride, butylaluminum sesquichloride and ethylaluminum sesquibromide;

alkylaluminum dihalides such as methylaluminum dichloride, elthylaluminum dichloride, isopropylaluminum dichloride and ethylaluminum dibromide; and alkylaluminum hydrides such as dimethylaluminum hydride, diethylaluminum hydride, dihydrophenylaluminum hydride, diisoproilylaluminum hydride, di-n-butylaluminum hydride, diisobutylaluminum hydride, diisohexylaluminum hydride, diphenylaluminum hydride, dicyclohexylaluminum hydride, di-sec-heptylaluminum hydride and di-secnonylaluminum hydride.

Furthermore, there may also be used other organoaluminum compounds represented by the following formula (IV) as the organoaluminum compound (D);

$$R^6{}_nAlY_{3-n}$$

wherein $R^6$ is as defined previously, Y is $-OR^7$, $-OSiR^8{}_3$, $-OAlR^9{}_2$, $-NR^{10}{}_2$, $-SiR^{11}{}_3$ or $-N(R^{12})AlR^{13}{}_2$, n is 1 to 2, $R^7$, $R^8$, $R^9$ and $R^{13}$ are each methyl, ethyl, isopropyl, isobutyl, cyclohexyl or phenyl, $R^{10}$ is hydrogen, methyl, ethyl, isopropyl, phenyl or trimethylsilyl, $R^{11}$ and $R^{12}$ are each methyl or ethyl.

The organoaluminum compounds as mentioned above include, in concrete, such compounds as enumerated below.

(1) Compounds of the formula $R^6{}_nAl(OR^7)_{3-n}$ such as dimethylaluminum methoxide, diethylaluminum ethoxide and diisobutylaluminum methoxide.

(2) Compounds of the formula $R^6{}_nAl(OSiR^8{}_3)_{3-n}$ such as $Et_2Al(OSiMe_3)$, $(iso\text{-}Bu)_2Al(OSiMe_3)$ and $(iso\text{-}Bu)_2Al(OSiEt_3)$.

(3) Compounds of the formula $R^6{}_nAl(OAlR^9{}_2)_{3-n}$ such as $Et_2AlOAlEt_2$ and $(iso\text{-}Bu)_2AlOAl(iso\text{-}Bu)_2$.

(4) Compounds of the formula $R^6{}_nAl(NR^{10}{}_2)_{3-n}$ such as $Me_2AlNEt_2$, $Et_2AlNHMe$, $Me_2AlNHEt$, $Et_2AlN(SiMe_3)_2$, $(iso\text{-}Bu)_2AlN(SiMe_3)_2$.

(5) Compounds of the formula $R^6{}_nAl(SiR^{11}{}_3)_{3-n}$ such as $(iso\text{-}Bu)_2AlSiMe_3$.

(6) Compounds of the formula $R^6{}_nAl(N(R^{12})AlR^{13}{}_2)_{3-n}$ such as $Et_2AlN(Me)AlEt_2$ and $(iso\text{-}Bu)_2AlN(Et)Al(iso\text{-}Bu)_2$.

Of the organoaluminum compounds represented by the general formulas (III) and (IV), preferred are those having the formulas $R^6{}_3Al$, $R^6{}_nAl(OR^7)_{3-n}$ and $R^6{}_nAl(OAlR^9{}_2)_{3-n}$, and particularly preferred are those having the above-mentioned formulas in which $R^6$ is isoalkyl and n is 2.

In the supported olefin polymerization catalyst according to the present invention, the above mentioned components are supported on the following solid carrier.

The carrier used in the present invention is a solid inorganic or organic compound in granules or fine particles having a particle size of 10 to 300 μm, preferably 20 to 200 μm. Of these carriers, porous oxides are preferable as inorganic carriers. Concrete examples of the oxide carriers include $SiO_2$, $Al_2O_3$, $MgO$, $ZrO_2$, $TiO_2, B_2O_3$, $CaO$, $ZnO$, $BaO$, $ThO_2$, or a mixture of these compounds such as $SiO_2\text{-}MgO$, $SiO_2\text{-}Al_2O_3$, $SiO_2\text{-}TiO_2$, $SiO_2\text{-}V_2O_5$, $SiO_2\text{-}Cr_2O_3$ and $SiO_2\text{-}TiO_2\text{-}MgO$. Of these carriers, preferred are those comprising at least one compound selected from the group consisting of $SiO_2$ and $Al_2O_3$ as a major component.

Furthermore, the above-mentioned inorganic oxide may also contain a small amount of a carbonate such as $Na_2CO_3$, $K_2CO_3$, $CaCO_3$ and $MgCO_3$, a sulfate such as $Na_2SO_4$, $Al_2(SO_4)_3$ and $BaSO_4$,, a nitrate such as $KNO_3$, $Mg(NO_3)_2$ and $Al(NO_3)_3$, and an oxide such as $Na_2O$, $K_2O$ and $Li_2O$.

Though the carriers have different properties among them depending on the types and preparation methods thereof, the carriers preferably used in the invention have a specific surface area of 50 to 1000 m²/g preferably 100 to 700 m²/g a pore volume of desirably 0.3 to 2.5 cm³/g. The carriers are prepared if necessary by firing at a temperature of 100° to 1000° C., preferably 150° to 700° C.

Moreover, there can be mentioned organic compounds in solid granules or fine solid particles each having a particle size of 10 to 300 μm as carriers which can be used as the carrier in the present invention. Examples of these organic compounds include (co)polymers containing as the main component constituent units derived from an α-olefin of 2 to 14 carbon acorns, such as ethylene, propylene, 1-butene and 4-methyl-1-pentene, or polymers or copolymers containing as the main component constituent units derived from vinylcyclohexane or styrene.

The olefin polymerization catalysts of the present invention are illustrated below in more detail.

The first olefin polymerization catalysts of the present invention are illustrated below in more detail.

(A) a transition metal compound of the group IVB of the periodic table containing a ligand having a cyclopentadienyl skeleton, (B) an organoaluminum oxy compound, and (C) at least one kind of carbonyl-containing compound selected from ketoalcohol and β-diketone.

The second olefin polymerization catalyst of the invention comprises (A) a transition metal compound of the group IVB of the periodic table containing a ligand having a cyclopentadienyl skeleton, (B) an organoaluminum oxy compound, (C) at least one kind of carbonyl-containing compound selected from ketoalcohol and β-diketone, and (D) an organoaluminum compound.

The first and second olefin polymerization catalysts of the invention may be prepared by adding the above-mentioned catalyst components to the polymerization system, followed by bringing them into contact with one another by mixing in the polymerization system. It is also possible that at least two components of the foregoing catalyst components are brought into beforehand with each other by mixing outside the polymerization system, and the thus contacted mixture is then added to the polymerization system. In this case, although an order of contact of the catalyst components is not critical, it is preferable that the components (B) and (C) are first brought into contact by mixing with each other, and the component (A) and, if necessary (D) are then brought into contact by mixing with the already contacted (B)–(C) mixture.

The above-mentioned components may be brought into contact by mixing with one another in an inert hydrocarbon solvent.

When the foregoing components (A), (B), (C) and, if necessary, (D) are added to the polymerization system and brought into contact by mixing therein with one another, the component (A) is used in an amount of $10^{-4}$–$2\times10^{-2}$ mol/liter-solvent, preferably $2\times10^{-4}$–$10^{-2}$ mol/liter-solvent. The component (B) is used in an amount of 10–5000, preferably 20–1000 and especially 30–500 in terms of atomic ratio (Al/transition metal) of aluminum (Al) contained in said component (B) to transition metal contained in the component (A). The component (C) is used in an amount, based on 1 mole of aluminum contained in the component (B), of 0.01–0.25 mole, preferably 0.02–0.20 mole and especially 0.03–0.15 mole. When the component (D) is used, if necessary, an amount to be used is 0.02–3, preferably 0.05–1.5 in terms of atomic ratio (Al-d/Al-b) of aluminum atom (Al-d) contained in the component (D) to aluminum atom (Al-b) contained in the component (B).

The temperature range at which the foregoing components are brought into contact by mixing with one another is –50° to 150° C., preferably –20° to 120° C., and the contact time is a period of 1 to 1000 minutes, preferably 5 to 600 minutes. The mixing temperature may be changed at the time of performing the above-mentioned contact by mixing of the components.

In the present invention, it is desirable that the components (B) and (C) are brought into contact with each other in advance in an inert solvent to prepare a solution containing a contacted mixture of the components (B) and (C), and the solution thus prepared is then brought into contact by mixing with other component (A) and, if necessary, the compound (D).

When the component (B) and (C) are brought into contact by mixing in advance, the concentration of the component (B) is 0.01–5 mol/liter-solvent, preferably 0.1–3 mol/liter-solvent. The amount of the component (C) is preferably, based on 1 mole of aluminum contained in the component (B), 0.01–0.25 mole, preferably 0.02–0.20 mole and especially 0.03–0.15 mole.

The mixing temperature employed at the time of contact by mixing the component (B) with the component (C) is –20° to 150° C., preferably 0°–120° C., and contact time is a period of 1–1000 minutes, preferably 5–600 minutes.

The inert hydrocarbons used in the preparation of the catalysts according to the present invention include concretely aliphatic hydrocarbons such as propane, butane, pentane, hexane, heptane, octane, decane, dodecane, kerosene, etc., alicyclic hydrocarbons such as cyclopentane, cyclohexane, methylcyclohexane, etc., aromatic hydrocarbons such as benzene, toluene, xylene, etc., halogenated hydrocarbons such as ethylene chloride, chlorobenzene, dichloromethane, etc., or mixtures thereof.

The first and second olefin polymerization catalysts of the present invention may also contain other useful components for olefin polymerization than those mentioned above.

The olefin polymerization catalysts of the invention as illustrated above are excellent in polymerization activity per catalyst unit weight and capable of giving olefin polymers high in molecular weight.

Now the invention is illustrated hereinafter with respect to its methods or the polymerization of olefins in which the foregoing first and second olefin polymerization catalysts of the invention are used.

Polymerization or copolymerization of olefins in the present invention are carried out usually in a liquid phase such as solution polymerization or slurry polymerization in the presence of the foregoing first and second olefin polymerization catalysts. In the solution or slurry polymerization, there may be used the above-mentioned inert hydrocarbons as solvents or may also be used the olefins themselves as solvents.

The inert hydrocarbons used in the solution or slurry polymerization of olefins include concretely aliphatic hydrocarbons such as propane, butane, isobutane, pentane, hexane, octane, decane, dodecane, hexadecane, octadecane, etc., alicyclic hydrocarbons such as cyclopentane, methyl cyclopentane, cyclohexane, cyclooctane, etc., aromatic hydrocarbons such as benzene, toluene, xylene, etc., and petroleum fractions such as gasoline, kerosene, light oil, etc.

In the polymerization, the aforesaid first and second olefin polymerization catalysts of the invention are each preferably used in an amount, in terms of metallic atom contained in the transition metal compound (A), of $10^{-8}$–$10^{-3}$ gram atom, preferably $10^{-7}$–$10^{-4}$ gram atom per 1 liter of the polymerization volume. The component (B) is preferably used in an amount, in terms of atomic ratio (Al/transition metal) of aluminum contained in the component (B) to transition metal contained in the component (A), of 10–5000, preferably 20–1000 and especially 30–500. The component (C) is preferably used in an amount, based on 1 mole of aluminum contained in the component (B), of 0.01–0.25 mole, preferably 0.02–0.20 mole and especially 0.03–0.15 mole. Further, when the component (D) is used, said component (D) is preferably used in an amount, in terms of atomic ratio (Al-d/Al-b) of aluminum atom (Al-d) contained in the component (D) to aluminum atom (Al-b) contained in the component (B), of 0.02–3, preferably 0.05–1.5.

When the components (B) and (C) are used as a solution containing a contacted mixture of said components (B) and (C), this solution is preferably used in an amount, in terms of atomic ratio (Al/transition metal) of aluminum (Al) contained in said solution to transition metal contained in the component (A), of 10–5000, preferably 20–1000 and especially 30–500.

When solution or slurry polymerization of olefins is carried out, the polymerization temperature employed is 0°–200° C., preferably 20°–150° C.

The polymerization pressure employed is ordinary pressure to 100 kg/cm$^2$, preferably 2–50 kg/cm$^2$, the polymerization may be carried out by any of batch process, semicontinuous process and continuous process.

This polymerization may also be carried out at two stages or more wherein reaction conditions to be employed are different from each other.

The olefins that can be polymerized by using the first and second olefin polymerization catalysts of the present invention include ethylene and (α-olefin having 3–20 carbons, for example, propylene, 1-butene, 1-pentene, 1-hexene, 4-methyl-1-pentene, 1-octene, 1-decene, 1-dodecene, 1-tetradecane, 1-hexadecene, 1-octadecene and 1-eicosene; cycloolefins having 3–20 carbons, for example, cyclopentene, cycloheptene, norbornene, 5-methyl-2-norbornene, tetracyclododecene, 2-methyl-1,4,5,8-dimetano-1,2,3,4,4a,5,8,8a-octahydronaphthalene, etc.

The supported olefin polymerization catalyst of the invention is illustrated below in more detail.

The third olefin polymerization catalyst of the invention is a solid catalyst comprising
a solid carrier,
(A) a transition metal compound of the group IVB of the periodic table containing a ligand having a cyclopentadienyl skeleton,
(B) an organoaluminum oxy compound, and
(C) at least one kind of carbonyl-containing compound selected from ketoalcohol and β-diketone,
wherein the components (A), (B) and (C) are supported on the solid carrier.

This olefin polymerization catalyst (solid catalyst component [I-1]) may be prepared by bringing the components (A), (B), (C) and a solid carrier into contact by mixing them in an inert hydrocarbon solvent.

Although the mixing order of the foregoing components is not critical, it is desirable that the components (B) and (C) are first brought into contact by mixing each other, and the component (A) or the solid carrier is brought into contact by mixing with the first contacted components (B) and (C).

The fourth olefin polymerization catalyst of the invention is a solid catalyst comprising
a solid carrier,
(A) a transition metal compound of the group IVB of the periodic table containing a ligand having a cyclopentadienyl skeleton,
(B) an organoaluminum oxy compound,
(C) at least; one kind of carbonyl-containing compound selected from ketoalcohol and β-diketone, and
(D) an organoaluminum compound,
wherein the components (A), (B), (C) and (D) are supported on the solid carrier.

This olefin polymerization catalyst (solid catalyst component [I-2]) may be prepared by bringing the components (A), (B), (C), (D) arid the solid carrier in an inert hydrocarbon solvent.

Although the mixing order of the above-mentioned component is not critical, it is preferable that the components (B) and (C) are first brought into contact by mixing each other, and the component (A) or the solid carrier and the component (D) are then brought into contact by mixing with the first contacted components (B) and (C).

In the present invention, when the components of the foregoing third and fourth supported catalysts are mixed together, the component (A) is used in an amount, per 1 g of the solid carrier, of $10^{-5}$–$5\times10^{-3}$ mole, preferably $5\times10^{-5}$–$10^{-3}$ mole. The concentration of the component (A) is $10^{-4}$–$2\times10^{-2}$ mol/liter-solvent, preferably $2\times10^{-4}$–$10^{-2}$ mol/liter-solvent. The component (B) is used in an amount, in terms of atomic ratio (Al/transition metal) of aluminum contained in the component (B) to transition metal contained in the component (A), of 10–500, preferably 20–200. The component (C) is used in an amount, per 1 mol of aluminum contained in the component (B), of 0.01–0.25 mole, preferably 0.02–0.20 mole and especially 0.03–0.15 mole. When the component (D) is used, said component (D) is used in an amount, in terms of gram atomic ratio (Al-d/Al-b) of aluminum atom (Al-d) contained in said component (D) to aluminum atom (Al-b) contained in the component (B), of 0.01–1, preferably 0.02–0.5.

The mixing temperature employed at the time of mixing the foregoing components together is −50° to 150° C., preferably −20° to 120° C., and the contact time is a period of 1–1000 minutes, preferably 5–600 minutes. The mixing-contact time and mixing temperature may be varied.

In the present invention, it is desirable that the components (B) and (C) are brought into contact in advance with each other in an inert hydrocarbon solvent to prepare a solution containing a contacted mixture of the components (B) and (C), and the solution is then brought into contact by mixing with other components.

When the components (B) and (C) are brought into contact by mixing with each other in advance, the concentration of the component (B) is 0.01–5 mol/liter-solvent, preferably 0.1–3 mol/liter-solvent. The component (C) is preferably used in an amount, per 1 mole of aluminum contained in the component (B), of 0.01–0.25 mole, preferably 0.02–0.20 mole and especially 0.03–0.15 mole. The mixing temperature to be employed at the time of contact by mixing the component (B) with the component (C) is $-20°$ to $150°$ C., preferably $0°–120°$ C., and the contact time is a period of 1–1000 minutes, preferably 5–600 minutes.

When the component (C) is used in this manner at the time of preparing catalysts, there can be prepared supported catalysts containing larger amount of catalyst components than those supported by the prior art supported catalysts. Particularly, when the components (B) and (C) are first brought into contact by mixing with each other to prepare a solution containing a contacted mixture of the components (B) and (C), and the solution is then brought into contact by mixing with other components, there can be prepared a solid catalyst component containing the supported components in larger amounts by far.

Inert hydrocarbons used in preparing the catalysts of the invention include concretely aliphatic hydrocarbons such as propane, butane, pentane, hexane, heptane, octane, decane, dodecane, kerosene, etc., alicyclic hydrocarbons such as cyclopentane, cyclohexane, methyl cyclopentane, etc.; aromatic hydrocarbons such as benzene, toluene, xylene, etc.; halogenated hydrocarbons such as ethylenechloride, chlorobenzene, dichloromethane, or mixture thereof.

In the third olefin polymerization catalyst of the invention, it is desirable that the transition metal atom from the component (A) is supported in an amount, per 1 g of the solid carrier, of $5\times10^{-6}$–$5\times10^{-4}$ gram atom, preferably $10^{-5}$–$2\times10^{-4}$ gram atom, the aluminum atom from the component (B) is supported in an amount of $10^{-3}$–$5\times10^{-2}$ gram atom, preferably $2\times10^{-3}$–$2\times10^{-2}$ gram atom, and the component (C) is supported in an amount of $10^{-4}$–$5\times10^{-3}$ mole, preferably $2\times10^{-4}$–$2\times10^{-3}$ mole.

In the fourth olefin polymerization catalyst of the invention, it is desirable that the transition metal atom from the component (A) is supported in an amount, per 1 g of the solid carrier of $5\times10^{-6}$–$5\times10^{-4}$ gram atom, preferably $10^{-5}$–$2\times10^{-4}$ gram atom, the aluminum atoms from the components (B) and (D) are supported in an amount of $10^{-3}$–$5\times10^{-2}$ gram atom, preferably $2\times10^{-3}$–$2\times10^{-2}$ gram atom, and the component (C) is supported in an amount of $10^{-4}$–$5\times10^{-3}$ mole, preferably $2\times10^{-4}$–$2\times10^{-3}$ mole.

The fifth olefin polymerization catalyst of the invention comprises the aforesaid solid catalyst component [I-2] and (E) an organoaluminum compound.

The component (E) is desirably used in an amount, per 1 gram atom of the transition metal atom of the component (A) contained in the solid catalyst component [I-1], of 500 moles or less, preferably 5–200 moles.

The sixth olefin polymerization catalyst of the invention comprises the aforesaid solid catalyst component [I-2] and (E) an organoaluminum compound.

The component (E) is desirably used in an amount, per 1 gram atom of the transition metal atom of the component (A) contained in the solid catalyst component [I-2] of 500 mole or less, preferably 5–200 moles.

The organoaluminum compound (E) used in the fifth and sixth olefin polymerization catalysts of the invention may be those similar to the foregoing organoaluminum compound (D).

The seventh olefin polymerization catalyst of the invention comprises: a solid catalyst component comprising
 a solid carrier,
 (A) a transition metal compound of the group IVB of the periodic table containing a ligand having a cyclopentadienyl skeleton,
 (B) an organoaluminum oxy compound, and
 (C) at least one kind of carbonyl-containing compound selected from ketoalcohol and β-diketone,
wherein the components (A), (B) and (C) are supported on the solid carrier; and a prepolymerized olefin polymer.

This olefin polymerization catalyst (prepolymerized catalyst component [I '-1]) may usually be obtained by prepolymerizing an olefin in the presence of the components (A), (B), (C) and the solid carrier.

The eighth olefin polymerization catalyst of the invention comprises: a solid catalyst component comprising
 a solid carrier,
 (A) a transition metal compound of the group IVB of the periodic table containing a ligand having a cyclopentadienyl skeleton,
 (B) an organoaluminum oxy compound,
 (C) at least one kind of carbonyl-containing compound selected from ketoalcohol and β-diketone, and
 (D) an organoaluminum compound,
wherein the components (A), (B), (C) and (D) are supported on the solid carrier; and a prepolymerized olefin polymer.

This olefin polymerization catalyst (prepolymerized catalyst component [I'-2]) may usually be obtained by prepolymerizing an olefin in the presence of the components (A), (B), (C), (D) and the solid carrier.

In practicing the prepolymerization, the component (A) is used in an amount of $10^{-6}$–$2\times10^{-2}$ mol/liter (polymerization volume), preferably $5\times10^{-5}$–$10^{-2}$ mol/liter, and the component (A) is used in an amount, in terms of transition metal, of $5\times10^{-6}$–$5\times10^{-4}$ mole, preferably $10^{-5}$–$2\times10^{-4}$ mol per 1 g of the solid carrier. The component (B) is used in an amount, in terms of atomic ratio (Al/transition metal) of aluminum (Al) contained in said component (B) to transition metal contained in the compound (A), of 10–500, preferably 20–200. The component (C) is used in an amount, per 1 mole of the component (B), of 0.01–0.25 mole, preferably 0.02–0.20 mole and especially 0.03–0.15 mole. Further, when the component (D) is used, said component (D) is used in an amount, in terms of atomic ratio (Al-d/Al-b) of aluminum atom (Al-d) contained in said component (D) to aluminum atom (Al-b) contained in the component (B), of 0.01–1, preferably 0.02–0.5.

When the seventh olefin polymerization catalyst is prepared by prepolymerization of olefin in the presence of the above-mentioned solid catalyst component [I-1], the solid catalyst component [I-1] is used in an amount, in terms of the component (A), of $10^{-6}$–$2\times10^{-2}$ mol/liter (polymerization volume), preferably $5\times10^{-5}$–$10^{-2}$ mol/liter. In this case, there may be used the organoaluminum compound (D), if necessary. When the organoaluminum compound (D) is used, said compound (D) is used in an amount, per 1 gram atom of the transition metal of the component (A) contained in the solid catalyst component [I-1], of not more than 200 moles, preferably 3–150 moles.

When the eighth olefin polymerization catalyst is prepared by the prepolymerization of olefin in the presence of the aforesaid solid catalyst component [I-2], said solid catalyst component [I-2] is used in an amount, in terms of the component (A), of $10^{-6}$–$2\times10^{-2}$ mol/liter (polymerization volume), preferably $5\times10^{-5}$–$10^{-2}$ mol/liter. In this case, there may be used the organoaluminum compound (D) may be used, if necessary. When the organoaluminum compound (D) is used in this manner, said compound (D) is used in an amount, per 1 gram atom of the transition metal of the component (A) contained in the solid catalyst component [I-2], of not more than 200 moles, preferably 3–150 moles.

The prepolymerization temperature employed is −20° to 80° C., preferably 0°–60° C. and especially 10°50° C., and the prepolymerization time is a period of about 0.5–100 hours, preferably 1–50 hours.

In practicing the prepolymerization, there are used olefins similar to those used in the polymerization mentioned later. Preferably, however, the olefins used are those having ethylene as their principal ingredient.

The prepolymerization may be carried out by any of batchwise, semi-continuous and continuous processes.

In the seventh olefin polymerization catalyst of the invention, it is desirable that the transition metal atom contained in the component (A) is supported in an amount, per 1 g of the solid carrier, of $5\times10^{-6}$–$5\times10^{-4}$ gram atom, preferably $10^{-5}$–$2\times10^{-4}$ gram atom, the aluminum atom contained in the component (B) is supported in an amount of $10^{-3}$–$5\times10^{-2}$ gram atom, preferably $2\times10^{-3}$–$2\times10^{-2}$ gram atom, the component (C) is supported in an amount of $10^{-4}$–$5\times10^{-3}$ mole, preferably $2\times10^{-4}$–$2\times10^{-3}$ mol, and the polymer resulting at the time of prepolymerization is contained in an amount, per 1 g of the solid carrier, of 0.1–500 g, preferably 0.3–300 g and especially 1–100 g.

Further, in the eighth polymerization catalyst of the invention, it is desirable that the transition metal atom from the component (A) is supported in an amount, per 1 g of the solid carrier, of $5\times10^{-6}$–$5\times10^{-4}$ gram atom, preferably $10^{-5}$–$2\times10^{-4}$ gram atom, the aluminum atoms from the components (B) and (D) are supported in an amount of $10^{-3}$–$5\times10^{-2}$ gram atom, preferably $2\times10^{-3}$–$2\times10^{-2}$ gram atom, the component (C) is supported in an amount of $10^{-4}$–$5\times10^{-3}$ mol, preferably $2\times10^{-4}$–$2\times10^{-3}$ mol, and the polymer resulting at the time of the prepolymerization is contained in an amount, per 1 g of the solid carrier, of 0.1–500 g, preferably 0.3–300g and especially 1–100 g.

The ninth polymerization catalyst of the invention comprises the aforesaid prepolymerized catalyst component [I'-1] and (E) the organoaluminum compound.

The component (E) is preferably used in an amount, per 1 gram atom of the transition metal atom of the component (A) contained in the prepolymerized catalyst component [I'-1], of not more than 500 moles, preferably 5–200 moles.

The tenth olefin polymerization catalyst of the invention comprises the aforesaid prepolymerized catalyst component [I'-2] and (E) the organoaluminum compound.

The component (E) is preferably used in an amount, per 1 gram atom of the transition metal atom of the component (A) contained in the prepolymerized catalyst component [I'-2], of not more than 500 moles, preferably 5–200 moles.

The organoaluminum components (E) used in the ninth and tenth olefin polymerization catalysts of the invention are those similar to the aforesaid organoaluminum compounds (D).

The supported olefin polymerization catalysts of the invention may contain other components useful for olefin polymerization than the above-mentioned components.

The supported olefin polymerization catalysts of the invention as illustrated above are excellent in polymerization activity per catalyst unit weight and capable of giving polymers uniform in particle size (there are contained only few fine powdery polymers).

The methods for the polymerization of olefins using the supported olefin polymerization catalysts of the invention are illustrated hereinafter.

In the present invention, the polymerization or copolymerization of olefins are carried out in the presence of the above-mentioned supported olefin polymerization catalysts. The above-mentioned polymerization or copolymerization can be carried out by any of the liquid phase polymerization process such as suspension polymerization and vapor phase polymerization process.

In the liquid phase polymerization process, the same inert hydrocarbons as used in the preparation of the catalysts may be used as the solvents, and the olefins themselves may also be used as the solvents.

In carrying out olefin polymerization using the supported olefin polymerization catalysts of the invention, the catalyst as mentioned above is preferably used in an amount, in terms of concentration of the transition metal atom off the component (A) contained in the polymerization system, of $10^{-8}$–$10^{-3}$ gram atom/liter (polymerization volume), preferably $10^{-7}$–$10^{-4}$ gram atom/liter (polymerization volume). In this case, these may be used for organoaluminum oxy compound, if desired. The amount of the organoaluminum oxy compound used is desirably 0–500 moles per 1 gram atom of the transition metal contained in the component (A).

When the slurry polymerization process is carried out, the polymerization temperature employed is −50° to 100° C., preferably 0°–90° C. and especially 60°–90° C. When the liquid phase polymerization process is carried out, the polymerization temperature employed is desirably 0°–250° C., preferably 20°0–200° C. When the vapor phase polymerization process is carried out, the polymerization temperature employed is desirably 0°–120° C., preferably 20°–100° C. and especially 60°–100° C. The polymerization pressure employed is ordinary pressure—100 kg/cm$^2$, preferably ordinary pressure—50 kg/cm$^2$. The polymerization reaction may be carried out by any of batchwise, semi-continuous and continuous processes. Further, the polymerization may also be carried out by dividing into two stages or more under different reaction conditions.

The molecular weight of the resulting olefin polymer may be adjusted by allowing hydrogen to present in the polymerization system, or by varying the polymerization temperature.

The olefins that can be polymerized by means of such supported olefin polymerization catalysts of the invention as aforesaid include ethylene and α-olefin of 3–20 carbons, for example, propylene, 1-butene, 1-pentene, 1-hexene, 4-methyl-1-pentene, 1-octene, 1-decene, 1-dodecene, 1-tetradecene, 1-hexadecene, 1-octadecene and 1-eicosene; cycloolefin of 5–20 carbons, for example, cyclopentene, cycloheptene, norbornene, 5-methyl-2-norbornene, tetracyclododecene, 2-methyl-1, 4,5,8-dimetano- 1,2,3,4,4a,5,8, 8a-octahydronaphthalene, etc. Further, there may also be used styrene, vinyl cyclohexane or diene.

EFFECT OF THE INVENTION

According to the olefin polymerization catalysts of the present invention, there are obtained olefin polymers excellent in polymerization activity per catalyst unit weight arid also high in molecular weight. Further, according to the supported olefin polymerization catalyst of the present invention, these are obtained olefin polymers excellent in polymerization activity per catalyst unit weight arid also uniform in particle size (there are contained only a few fine powdery polymers).

EMBODIMENT

The present invention is illustrated below in more detail with reference to examples, but it should be construed that the invention is in no way limited to these examples.

The melt flow rate (MFR), density, average particle diameter and amount of finely divided powder of the resulting polymers were determined according to the following procedure.

[Melt flow rate]

Measurement was carried out in accordance with ASTM D785 under the conditions where the temperature was 190° C. and a load applied was 2.16 kg.

[Density]

Measurement was carried out according to a density gradient tube method.

[Average article diameter and amount of finely divided powder]

Measurements of average particle diameter and amount of finely divided powder were carried out by using a sieve.

EXAMPLE 1

[Contact of methyl aluminoxane with β-diketone]

A thoroughly nitrogen purged 200 ml glass flask was charged with 76.3 ml of methyl aluminoxane in toluene (a product of Schering, Lot No. TB6–49, Al; 1.31 mole/l) and 23.7 ml of toluene.

The system was cooled to 0° C., and 30 ml of a toluene solution of acetylacetone (0.25 mol/l) was then added dropwise in a period of 20 minutes. Successively, reaction was allowed to undergo for 30 minutes at 0° C., for 1 hour at room temperature and then 4 hours at 40° C.

The reaction product of methyl aluminoxane with acetylacetone (hereinafter called "modified methyl aluminoxane (a)") was homogeneous pale yellow toluene solution.

[Polymerization]

A thoroughly nitrogen purged 1 liter glass autoclave was charged with 465 ml of toluene and 35 ml of 1-octene, and the temperature within the system was elevated to 50° C.

Thereafter, while feeding ethylene gas, polymerization was initiated by adding 0.67 ml of a toluene solution (Al: 0.74 mol/l) of the above-mentioned modified methyl aluminoxane (a) and 1.25 ml of a toluene solution (Zr: 2 mmol/l) of his (1,3-n-butylmethylcyclopentadienyl)zirconium dichloride to the autoclave. Subsequently, while continuously feeding ethylene gas, the polymerization was allowed to proceed under normal pressure at 50° C. for 15 minutes.

The polymerization was stopped by addition to the system of small amount of methanol, and the polymer solution was poured in large amounts of methanol to separate the polymer. The polymer was recovered by filtration and dried under reduced pressure at 80° C. overnight to obtain 12.8 g of an ethylene/1-octene copolymer having MFR of 0.33 g/10 min and a density of 0.905 g/cm$^3$. Results obtained are shown in Table 1.

Comparative Example 1

[Polymerization]

There was obtained 13.9 g of an ethylene/1-octene copolymer having MFR of 1.32 g/10 min and a density of 0.905 g/cm$^3$ by carrying out copolymerization of ethylene and 1-octene in the same manner as in Example 1 except that in place of the toluene solution of modified methyl aluminoxane (a), there was used methyl aluminoxane (a product of Schering, Lot No. TB 6–49) in an amount of 0.5 mg atom in terms of Al atom. Results obtained are shown in Table 1.

EXAMPLE 2 [Contact of methyl aluminoxane with β-diketone]

Methyl aluminoxane was allowed to react with acetylacetone in the same manner as in Example 1 except that in place of the methyl aluminoxane (Lot No. TB 6–49), there was used methyl aluminoxane (a product of Schering, Lot No. TB 6.1–503).

The toluene solution of the reaction product of methyl aluminoxane and acetylacetone (hereinafter called "modified methyl aluminoxane (b)") was homogeneous pale yellow. [Polymerization]

Copolymerization of ethylene and 1-octene was carried out in the same manner as in Example 1 except that in place of a toluene solution of the modified methyl aluminoxane (a), there was used the toluene solution of the above-mentioned modified methyl aluminoxane (b), thereby obtaining 14.0 g of an ethylene/1-octene copolymer having MFR of 0.29 g/10 min and a density of 0.904 g/cm$^3$. Results are shown in Table 1.

Comparative Example 2 [Polymerization]

There was obtained 14.5 g of an ethylene/1-octene copolymer having MFR of 0.84 g/10 min and a density of 0.905 g/cm$^3$ by repeating the same procedure as in Example 1 except that in place of the toluene solution of the modified methyl aluminoxane (a), there was used methyl aluminoxane (a product of Schering, Lot No. TB 6.1–503) in an amount of 0.5 mg atom in terms of Al atom. Results obtained are shown in table 1.

EXAMPLE 3 [Contact of aluminoxane with β-diketone]

Aluminoxane and acetylacetone were reacted with each other by repeating the same manner as in Example 1 except that in place of the methyl aluminoxane (Lot No. TB 6–49), there was used MMAO (a product of Akzo, Lot No. MMAO-204). The toluene solution of the reaction product of aluminoxane and acetylacetone (hereinafter called "Modified aluminoxane (c)") was a homogeneous pale yellow.

[Polymerization]

There was obtained 12.7 g of an ethylene/1-octene copolymer having MFR of 0.22 g/10 min and a density of 0.905 g/cm$^3$ by repeating the same procedure as in Example 1 except that in place of the toluene solution of modified methyl aluminoxane (a), there was used the above-mentioned modified aluminoxane (c). Results obtained are shown in Table 1.

Comparative Example 3

[Polymerization]

There was obtained 16.5 g of an ethylene/1-octene copolymer having MFR of 1.54 g/10 min and a density of 0.905 g/cm$^3$ by repeating the same procedure as in Example 1 except that in place of the toluene solution of modified methyl aluminoxane (a), there was used MMAO (a product of Akzo, Lot No. MMAO-204) in an amount of 0.5 mg atom in terms of Al atom. Results obtained are shown in Table 1.

EXAMPLE 4

[Polymerization]

There was obtained 13.5 g of an ethylene/1-octene copolymer having MFR of 0.74 g/10 min and a density of 0.907 g/cm$^3$ by carrying out copolymerization of ethylene and 1-octene in the same manner as in Example 1 except that in place of the bis (1,3-n-butylmethylcyclopentadienyl) zirconium dichloride, there was used bis (cyclopentadienyl)zirconium dichloride. Results obtained are shown in Table 1.

Comparative Example 4

[Polymerization]

There was obtained 15.8 g of an ethylene/1-octene copolymer having MFR of 6.94 g/10 min and a density of 0.906 g/cm$^3$ by carrying out copolymerization of ethylene and 1-octene in the same manner as in Comparative Example 1 except that in place of the his (1,3-n-butylmethytcyclopentadienyl) zirconium dichloride, there was used his (cyclopentadienyl)zirconium dichloride. Results obtained are shown in Table 1.

EXAMPLE 5

[Contact of methyl aluminoxane with β-diketone]

Reaction of methyl aluminoxane with acetylacetone was carried out in the same manner as in Example 1 except that the amount of the acetylacetone used was changed to 20 ml. The toluene solution of the reaction product of methyl aluminoxane and acetylacetone (hereinafter called "modified methyl aluminoxane (d) ") was a homogeneous pale yellow.

[Polymerization]

There was obtained 13.4 g of an ethylene/1-octene copolymer having MFR of 0.45 g/10 min and a density of 0.905 g/cm$^3$ by carrying out copolymerization of ethylene and 1-octene in the same manner as in Example 1 except that in place of the toluene solution of the modified methyl aluminoxane (a), there was used the above-mentioned modified methyl aluminoxane (d). Results obtained are shown in Table 1.

EXAMPLE 6

[Contact of methyl aluminoxane with β-diketone]

Aluminoxane was allowed to react with 4-hydroxy-3-methyl-2-butanone in the same manner as in Example 1 except that in place of the acetylacetone, there was used 7.5 mmol of 4-hydroxy-3-methyl-2-butanone. The toluene solution of the reaction product of aluminoxane and 4-hydroxy-3-methyl-2-butanone (hereinafter called "modified aluminoxane (e) ") was a homogeneous pale yellow.

[Polymerization]

There was obtained 11.3 g of an ethylene/1-octene copolymer having MFR of 0.29 g/10 min and a density of 0.906 g/cm$^3$ by carrying out copolymerization of ethylene and 1-octene in the same manner as in Example 1 except that in place of the modified methyl aluminoxane (a), there was used the above-mentioned modified aluminoxane (e). Results obtained are shown in Table 1.

EXAMPLE 7

[Polymerization]

There was obtained 12.3 g of an ethylene/1-decene copolymer having MFR of 0.38 g/10 min and a density of 0.903 g/cm$^3$ by carrying out the copolymerization of Example 1 except that in place of 1-octene, there was used 40 ml of 1-decene. Results obtained are shown in Table 1.

TABLE 1

| | Copolymer | Polymerization activity *1) | MFR (g/10 min.) | Density (g/cm$^3$) |
|---|---|---|---|---|
| Example 1 | Ethylene/1-octene | 5120 | 0.33 | 0.905 |
| Comp. Ex. 1 | Ethylene/1-octene | 5560 | 1.32 | 0.905 |
| Example 2 | Ethylene/1-octene | 5600 | 0.29 | 0.904 |
| Comp. Ex. 2 | Ethylene/1-octene | 5800 | 0.87 | 0.905 |
| Example 3 | Ethylene/1-octene | 5080 | 0.22 | 0.905 |
| Comp. Ex. 3 | Ethylene/1-octene | 6600 | 1.54 | 0.905 |
| Example 4 | Ethylene/1-octene | 5400 | 0.74 | 0.907 |
| Comp. Ex. 4 | Ethylene/1-octene | 6320 | 6.94 | 0.906 |
| Example 5 | Ethylene/1-octene | 5360 | 0.45 | 0.905 |
| Example 6 | Ethylene/1-octene | 4520 | 0.29 | 0.906 |
| Example 7 | Ethylene/1-decene | 4920 | 0.38 | 0.903 |

*1) g-polymer/mmol.Zr

EXAMPLE 8

[Contact of methyl aluminoxane with β-diketone]

A thoroughly nitrogen purged 400 ml of glass flask was charged with 150 ml of a toluene solution of methyl aluminoxane (a product of Schering, Lot No. TB6.1–503; Al; 1.45 mol/l).

After decreasing the temperature in the system to 0° C., a solution obtained by diluting 1.66 ml of acetylacetone with 25 ml of toluene was added to the system in a period of 20 minutes. Successively, reaction was carried out for 30 minutes at 0° C. and then for 4 hours at 40° C. The toluene solution of the reaction product of methyl aluminoxane and acetylacetone (hereinafter called "modified methyl aluminoxane (f)") was homogeneous pale yellow.

Preparation of solid catalyst (A-1)

A thoroughly nitrogen purged 200 ml glass flask was charged with 50 ml of the above-mentioned modified methyl aluminoxane (f), 50 ml of toluene and 18.7 ml of a toluene solution (Zr; 23.8 mmol/l) of bis(1,3-n-butyhnethylcyclopentadienyl) zirconium dichloride, and reaction was carried out for 1 hour at 40° C.

Thereafter, 6.3 g of silica dried at 250° C. for 10 hours was added to the system in a period of 20 minutes. The temperature within the system was kept at 40° C. Successively, this temperature was raised up to 60° C. and the reaction was carried out at that temperature for 6 hours.

After completion of the reaction, the supernatant was removed by means of decantation, the thus obtained solid catalyst component (A-1) was washed once with 200 ml of toluene and twice with 200 ml of hexane. In 1 g of this solid catalyst component (A-1), 170 mg of aluminum and 3.7 g of zirconium were contained. [Preparation of prepolymerized catalyst (B-1)]

There was obtained the prepolymerized catalyst (B-1)] containing 3.7 mg of zirconium and 3 g of polyethylene per 1 g of the solid catalyst component (A-1) by carrying out prepolymerization of ethylene at 50° C. for 3 hours while adding 2.75 g of the above-mentioned solid catalyst component (A-1) to 100 ml of hexane containing 5.6 mmol of diisobutylaluminum hydride.

[Polymerization]

A thoroughly nitrogen purged 2 liter stainless autoclave was charged with 1 liter of hexane, and the system was substituted with ethylene. Thereafter, the autoclave was charged with 40 ml of 1-hexene, and the temperature within the system was elevated to 70° C. Successively, polymerization was initiated by charging under pressure 0.75 mmol of triisobutylaluminum and 112 mg of the prepolymerized catalyst (B-1) prepared above as a solid catalyst.

Thereafter, ethylene was fed continuously to carry out polymerization for 1.5 hours at 80° C. under a pressure of 8 kg/cm$^3$-G.

After completion of the polymerization, the resulting polymer was recovered by filtration, there was obtained 336 g of the ethylene/1-hexene copolymer by drying under reduced pressure at 80° C. overnight. The resulting copolymer had MFR of 0.13 g/10 min as measured under a load of 2.16 kg at 190° C., a density of 0.922 g/cm$^3$, a bulk density of 0.44 g/cm$^3$, an average particle diameter of 630 μm and fine powderly polymer of below 100 μm in an amount of 0.05% by weight. The activity per solid catalyst was 3000 g-polymer/g-catalyst. Results obtained are shown in Table 2.

Comparative Example 5

[Preparation of solid catalyst component (A-2)]

A solid catalyst component was prepared in the same manner as in Example 8 except that in place of the toluene solution of the modified methyl aluminoxane (f), there was used methyl aluminoxane (a product of Schering, Lot No. TB 6.1–503). In 1 g of the solid catalyst component (A-2) thus obtained, there were contained 88 mg of aluminum and 1.6 mg of zirconium.

[Preparation of prepolymerized catalyst (B-2)]

A prepolymerized catalyst (B-2) containing 1.1 mg of zirconium and 3 g of polyethylene per 1 g of the solid catalyst component (A-2) was prepared by carrying out prepolymerization of ethylene at 50° C. for 3 hours while adding 6.31 g of the above-mentioned solid catalyst component (A-2) to 200 ml of hexane containing 5.6 mmol of diisobutylaluminum hydride.

[Polymerization]

In the same manner as in Example 8, copolymerization of ethylene and 1-hexene was carried out to obtain 383 g of an ethylene/1-hexene copolymer, except that in place of the prepolymerized catalyst (B-1), there was used 415 mg of the above-mentioned prepolymerized catalyst (B-2). The resulting copolymer had MFR of 0.18 g/10 min, a density of 0.923 g/cm$^3$, a bulk density of 0.36 g/cm$^3$, an average particle diameter of 440 μm, and an amount of fine powdery polymer of below 100 μm of 0.20% by weight. The activity per solid catalyst was 920 g-polymer/g-catalyst. Results obtained are shown in Table 2.

EXAMPLE 9

[Contact of methyl aluminoxane with β-diketone]

In the same manner as in Example 8, methyl aluminoxane was allowed to react with acetylacetone, except that in place of methyl aluminoxane (Lot No. TB 6.1–503), there was used methyl aluminoxane (a product of Schering, Lot No. TB 6.1–373). The toluene solution of the reaction product of methyl aluminoxane and acetylacetone thus obtained (hereinafter called "modified methyl aluminoxane (g)") was homogeneous pale yellow.

Preparation of solid catalyst component (A-3)

A thoroughly nitrogen purged 400 ml glass flask was charged with 10.1 g of silica dried at 250° C. for 10 hours and 150 ml of toluene, and the temperature in the system was decreased to 0° C. Thereafter, 76.4 ml of a toluene solution (A1; 1.02 mol/l) of the modified methyl aluminoxane (g) was added dropwise in a period of 45 minutes. The temperature within the system was kept at 0° C. Successively, the reaction was allowed to proceed at 0° C. for 30 minutes, and the temperature was raised to 95° C. in a period of 30 minutes and the reaction was allowed to proceed further for 4 hours at that temperature. Thereafter, the temperature was decreased to 60° C., the supernatant was then removed by means of decantation technique and a solid catalyst thus obtained was rinsed twice with toluene.

3.7 g of the solid component thus obtained was suspended in 60 ml of toluene, and then charged with 6.2 ml of a toluene solution (Zr; 23.8 mmol/l) of bis(1,3-n-butylmethylcyclopentadienyl) zirconium dichloride (Al/Zr, molar ratio=130), and reaction was allowed to proceed at 80° C. for 2 hours. Thereafter, the supernatant was removed, and washed twice with hexane to obtain a solid catalyst component (A-3). In 1 g of this solid catalyst (A-3), there were contained 150 mg of aluminum and 3.8 mg of zirconium.

[Preparation of prepolymerized catalyst (B-3)]

A prepolymerized catalyst (B-3) containing 3.7 mg of zirconium and 3 g of polymer per 1 g of the solid catalyst component (A-3) was prepared by carrying out prepolymerization of ethylene at 35° C. for 2 hours, while adding the total amount of the above-mentioned solid catalyst component (A-3) and 0.66 ml of 1-hexane to 150 ml of hexane containing 7.4 mmol of triisobutylaluminum.

[Polymerization]

There was obtained 308 g of an ethylene/1-hexene copolymer by carrying out copolymerization of ethylene and 1-hexene in the same manner as in Example 8 except that in place of the prepolymerized catalyst (B-1), there was used 123 mg of the above-mentioned prepolymerized catalyst (B-3). The copolymer thus obtained had MFR of 0.11 g/10 min, a density of 0.923 g/cm$^3$, a bulk density of 0.43 g/cm$^3$, an average particle diameter of 610 μm, and an amount of fine powdery polymer of below 100 gm of 0.02% by weight. The activity per solid catalyst was 2500 g-polymer/g-catalyst. Results obtained are shown in Table 2.

Comparative Example 6

[Preparation of solid catalyst component (A-4)]

A solid catalyst component was prepared in the same manner as in Example 9 except that in place of the modified methyl aluminoxane (g), there was used methyl aluminoxane (a product of Schering, Lot No. TB6.1–373. In 1 g of the thus obtained solid catalyst component (A-4), there were contained 110 mg of aluminum and 2.9 mg of zirconium.

[Preparation of prepolymerized catalyst (B-4)]

A prepolymerized catalyst (B-4) containing 2.6 mg of zirconium and 3 g of polymer per 1 g of the solid catalyst component (A-4) was prepared by carrying out prepolymerization of ethylene at 35° C. for 2 hours, while adding 3.90 g of the above-mentioned solid catalyst component (A-4) and 0.52 ml of 1-hexene to 130 ml of hexane containing 6.4 mmol of triisobutylaluminum.

[Polymerization]

Copolymerization of ethylene and 1-hexene was carried out in the same manner as in Example 8 except that in place of the prepolymerized catalyst (B-1), there was used 179 mg of the above-mentioned prepolymerized catalyst (B-4) as a solid catalyst, thereby obtaining 304 g of an ethylene/1-hexene copolymer having MFR of 0.14 g/10 min, a density of 0.924 g/cm$^3$, a bulk density of 0.45 g/cm$^3$, an average particle diameter of 540 μm, and an amount of fine powdery of below 100 μm of 0.20% by weight. The activity per solid catalyst was 1700 g-polymer/g-catalyst. Results obtained are shown in Table 2.

EXAMPLE 10

[Contact of methyl aluminoxane with β-diketone]

Methyl aluminoxane was allowed to react with acetylacetone in the same manner as in Example 8 except that the amount of acetylacetone used was charged to 1.10 ml. There was obtained a toluene solution of the reaction product of methyl aluminoxane and acetylacetone (hereinafter called "modified methyl aluminoxane (h)").

[Preparation of solid catalyst component (A-5)]

A solid catalyst component was prepared in the same manner as in Example 8 except that in place of the modified methyl aluminoxane (f) there was used the toluene solution of the above-mentioned modified methyl aluminoxane (h). In 1 g of the thus obtained solid catalyst component (A-5), there were contained 140 mg off aluminum and 3.5 mg off zirconium.

[Preparation of prepolymerized catalyst (B-5)]

A prepolymerized catalyst (B-5) containing 3.4 mg of zirconium and 3 g of polyethylene per 1 g of the solid catalyst component (A-5) was obtained by carrying out prepolymerization in the same manner as in Example 8 except that in place of the solid catalyst component (A-1), there was used the above-mentioned solid catalyst component (A-5).

[Polymerization]

There was obtained 327 g of an ethylene/1-hexene copolymer by carrying out copolymerization of ethylene and 1-hexene in the same manner as in Example 8 except that in place of the prepolymerized catalyst (B-1), there was used 121 mg of the above-mentioned prepolymerized catalyst (B-5). The ethylene/1-hexene copolymer thus obtained had MFR of 0.18 g/10 min, a density of 0.924 g/cm$^3$, a bulk density of 0.44 g/cm$^3$, an average particle diameter of 610 μm, and an amount of fine powdery polymer of below 100 μm of 0.02% by weight. The activity per solid catalyst was 2700 g-polymer/g-catalyst. Results obtained are shown in Table 2.

EXAMPLE 11

[Contact of methyl aluminoxane with ketoalcohol]

Aluminoxane was allowed to react with 4-hydroxy-3-methyl-2-butanone in the same manner as in Example 8 except that in place of acetylacetone, there was used 1.66 ml of 4-hydroxy-3-methyl-2-butanone. The solution of the reaction product of aluminoxane and 4-hydroxy-3-methyl-2-butanone (hereinafter called "modified aluminoxane (i)") was homogeneous pale yellow.

[Preparation of solid catalyst component (A-6)]

A solid catalyst component was prepared in the same manner as in Example 8 except that in place of the modified methyl aluminoxane (f), there was used a toluene solution of the above-mentioned modified aluminoxane (i). In 1 g of the thus obtained solid catalyst component (A-6), there were contained 170 mg of aluminum and 3.6 mg of zirconium.

[Preparation of prepolymerized catalyst (B-6)]

There was obtained a prepolymerized catalyst (B-6) containing 3.5 mg of zirconium and 3 g of polyethylene per 1 g of the solid catalyst component (A-5) by carrying out prepolymerization in the same manner as in Example 8 except that in place of the solid catalyst component (A-1), there was used the above-mentioned solid catalyst component (A-6).

[Polymerization]

There was obtained 295 g of an ethylene/1-hexene copolymer by carrying out copolymerization in the same manner as in Example 8 except that in place of the prepolymerized catalyst (B-1), there was used 123 mg of the above-mentioned prepolymerized catalyst (B-6). The ethylene/1-hexene copolymer thus obtained had MFR of 0.10 g/10 min, a density of 0 924 g/cm$^3$ a bulk density of 0 42 g/cm$^3$, an average particle diameter of 600 μm, and an amount of fine powdery polymer of below 100 μm of 0.04% by weight. The activity per solid catalyst was 2400 g-polymer/g-catalyst. Results obtained are shown in Table 2.

EXAMPLE 12

[Contact of methyl aluminoxane with β-diketone]

A 200-liter reactor was charged with 37 liters of toluene and 43 liters of a toluene solution (Al; 1.55 mol/l) of methyl aturninoxane (a product of Vitoco Co.). Thereafter, a solution of 333 g of acetylacetone diluted with 10 liters of toluene was added dropwise in a period of 30 minutes. The temperature within the system was kept at 25° C. Successively, reaction was allowed to proceed at 25° C. for 30 minutes and further at 40° C. for 6 hours. There was obtained a toluene solution of the reaction product of methyl aluminoxane and acetylacetone (hereinafter called "modified methyl aluminoxane (j)").

[Preparation of solid catalyst (A-7)]

To the modified methyl aluminoxane solution obtained above was added 20 liters of a toluene solution of (1,3-n-butylmethylcyclopentadienyl) zirconium dichloride (Zr; 25.5 mmol/l) in a period of 30 minutes. The temperature within the system was kept at 40° C. Successively, reaction was allowed to proceed at 40° C. for 1 hour. Thereafter, 10 kg of silica dried at 250° C. for 10 hours was charged in a period of 30 minutes. The temperature within the system was kept at 40° C. Successively, the temperature was elevated to 60° C. and reaction was allowed to proceed at that temperature for 2 hours.

After completion of the reaction, the supernatant was removed by means of decantation, and rinsed three times with 100 liters of hexane to obtain a solid catalyst component (A-7). In 1 g of this solid catalyst component (A-7), there were contained 130 mg of aluminum and 3.1 mg of zirconium.

[Preparation of prepolymerized catalyst (B-7)]

To 80 liters of hexane containing 1.4 mole of triisobutylaluminum were added 980 g of the above-mentioned solid catalyst (A-7) and 88 g of 1-hexene. Successively, there was obtained a prepolymerized catalyst containing 3.0 mg of zirconium and 3 g of an ethylene/1-hexene copolymer per 1 g of the solid catalyst component (A-7) by carrying out prepolymerization for 3 hours while feeding ethylene continuously.

[Polymerization]

Using a continuous fluidized bed vapor phase polymerization device, copolymerization of ethylene and 1-hexene was carried out under total pressure of 20 kg/cm²-G and at a polymerization temperature of 70° C. The prepolymerized catalyst prepared above was continuously fed in an amount of 0.035 mmol/hr in terms of zirconium atom and triisobutylaluminum in an amount of 5 mmol/hr was also fed-continuously. In order to maintain the gas composition at a definite level during the polymerization, ethylene, 1-hexene, hydrogen and nitrogen were fed continuously (gas composition; 1-hexane/ethylene=0.025, hydrogen/ethylene=4.1× $10^{-4}$, ethylene concentration=72%). The yield of the ethylene/1-hexene copolymer obtained was 5.4 kg/hr, and the copolymer had a density of 0.920 g/cm³, MFR of 3.9 g/10 min, a bulk density of 0.45 g/cm³, an average particle diameter of 980 μm, and an amount of fine powdery polymer of below 100 μm of 0% by weight. Results obtained are shown in Table 2.

EXAMPLE 13

[Polymerization]

A thoroughly nitrogen purged 2-liter stainless autoclave was charged with 150 g of sodium chloride (special class, a product of Wako Junyaku, K.K.), and the sodium chloride was dried under reduced pressure at 90° C. for 1 hour. Thereafter, into the autoclave, a mixed gas of ethylene and 1-butene (content of 1-butene; 3.3 mole %) was introduced to return the pressure within the autoclave to ordinary pressure and the temperature within the system was maintained at 70° C.

Subsequently, 132 mg of the solid catalyst component prepared in Example 12 and 0.5 mmol of triisobutylaluminum were added to the autoclave. Thereafter, the above-mentioned mixed gas of ethylene and 1-butene was introduced into the autoclave to initiate polymerization under total pressure 8 kg/cm²-G. The temperature within the system rose immediately to 80° C. Thereafter, only the mixed gas was fed and polymerization was allowed to proceed at 80° C. for 1.5 hours under total pressure of 8 kg/cm²-G After completion of the polymerization, the sodium chloride was removed by water washing, and the remaining polymer was rinsed with methanol, followed by drying under reduced pressure at 80° C. overnight.

As a result, there was obtained 323 g of an ethylene/1-butene copolymer having MFR of 0.55 g/10 min, a density of 0.913 g/cm³, a bulk density of 0.42 g/cm³, an average particle diameter of 740μm, and an amount of fine powdery polymer of below 100 μm of 0.13% by weight. The activity per solid catalyst was 2450g-polymer/g-catalyst. Results obtained are shown in Table 2.

EXAMPLE 14

[Preparation of solid catalyst component (A-8)]

There was obtained a solid catalyst component (A-8) containing 160 mg of aluminum and 2.7 mg of zirconium per 1 g of said solid catalyst component in the same manner as in Example 8 except that in place of bis(1,3-n-butylmethylcyclopentadienyl) zirconium dichloride, there was used 0.31 mmol of ethylene bis(indenyl)zirconium dichloride.

Preparation of prepolymerized catalyst (B-8)

There was obtained a prepolymerized catalyst (B-8) containing 2.6 mg of zirconium and 3 g of polyethylene per 1 g of the solid catalyst component (A-8) in the same manner as in Example 8 except that 3.9 mmol of diisobutylaluminum hydride was used.

[Polymerization]

There was obtained 223 g of an ethylene/1-hexene copolymer in the same manner as in Example 8, except that 62 mg of the prepolymerized catalyst (B-8) prepared above was used as a solid catalyst. The thus obtained copolymer had MFR of 0.01 g/10 min, or below, a bulk density of 0.41 g/cm³, an average particle diameter of 680 μm, and an amount of fine powdery polymer of below 100 μm of 0.10% by weight. The activity per solid catalyst was 3600 g-polymer/g-catalyst. Results obtained are shown in Table 2.

TABLE 2

| | Copolymer | Polymerization activity *1 | MFR (g/10 min) | Density (g/cm³) | Bulk specific gravity (g/cm³) | Avarage particle diameter (μm) | Amount of particulate polymer (wt %) |
|---|---|---|---|---|---|---|---|
| Ex. 8 | Ethylene/1-hexene | 3000 | 0.13 | 0.922 | 0.44 | 630 | 0.05 |
| Comp. Ex. 5 | Ethylene/1-hexene | 920 | 0.18 | 0.923 | 0.36 | 440 | 0.20 |
| Ex. 9 | Ethylene/1-hexene | 2500 | 0.11 | 0.923 | 0.43 | 610 | 0.02 |
| Comp. Ex. 6 | Ethylene/1-hexene | 1700 | 0.14 | 0.924 | 0.45 | 540 | 0.20 |
| Ex. 10 | Ethylene/1-hexene | 2700 | 0.18 | 0.924 | 0.44 | 610 | 0.02 |
| Ex. 11 | Ethylene/1-hexene | 2400 | 0.10 | 0.924 | 0.42 | 600 | 0.04 |
| Ex. 12 | Ethylene/1-hexene | — | 3.9 | 0.920 | 0.45 | 980 | 0 |
| Ex. 13 | Ethylene/1-butene | 2450 | 0.55 | 0.913 | 0.42 | 740 | 0.13 |
| Ex. 14 | Ethylene/1-hexene | 3600 | 0.01 | — | 0.41 | 680 | 0.10 |

*1) g-polymer/g-catalyst

What is claimed is:

1. An olefin polymerization catalyst comprising (A) a transition metal compound of the group IVB of the periodic table containing a ligand having a cyclopentadienyl skeleton, (B) an aluminoxane, and (C) at least one kind of carbonyl-containing compound selected from ketoalcohol and β-diketone, wherein, the component (B) is used in an amount of 10–5000 in terms of atomic ratio (Al/transition metal) of aluminum (Al) contained in the component (B) to transition metal contained in the component (A), the component (C) is used in an amount, based on 1 mole of aluminum contained in the component (B), of 0.01–0.25 mole, and the catalyst is prepared by a process comprising first contacting the components (B) and (C), and thereafter mixing the component (A) with the already contacted (B)–(C) mixture.

2. An olefin polymerization catalyst comprising (A) a transition metal compound of the group IVB of the periodic table containing a ligand having a cyclopentadienyl skeleton, (B) an aluminoxane, (C) at least one kind of carbonyl-containing compound selected from ketoalcohol and β-diketone, and (D) an organoaluminum compound, wherein, the component (B) is used in an amount of 10–5000 in terms of atomic ratio (Al/transition metal) of aluminum (Al) contained in the component (B) to transition metal contained in the component (A), the component (C) is used in an amount, based on 1 mole of aluminum contained in the component (B), of 0.01–0.25 mole, and the catalyst is prepared by a process comprising first contacting the components (B) and (C), and thereafter mixing the components (A) and (D) with the already contacted (B)–(C) mixture.

3. An olefin polymerization catalyst comprising a solid carrier, (A) a transition metal compound of the group IVB of the periodic table containing a ligand having a cyclopentadienyl skeleton, (B) an aluminoxane, and (C) at least one kind of carbonyl-containing compound selected from ketoalcohol and β-diketone, wherein said components (A), (B) and (C) are supported on said solid carrier, the component (B) is used in an amount of 10–500 in terms of atomic ratio (Al/transition metal) of aluminum (Al) contained in the component (B) to transition metal contained in the component (A), the component (C) is used in an amount, based on 1 mole of aluminum contained in the component (B), of 0.01–0.25 mole, and the catalyst is prepared by a process comprising first contacting the components (B) and (C), and thereafter mixing the remaining components with the already contacted (B)–(C) mixture.

4. An olefin polymerization catalyst comprising a solid carrier, (A) a transition metal compound of the group IVB of the periodic table containing a ligand having a cyclopentadienyl skeleton, (B) an aluminoxane, (C) at least one kind of carbonyl-containing compound selected from ketoalcohol and β-diketone, and (D) an organoaluminum compound, wherein said components (A), (B), (C) and (D) are supported on said solid carrier, the component (B) is used in an amount of 10–500 in terms of atomic ratio (Al/transition metal) of aluminum (Al) contained in the component (B) to transition metal contained in the component (A), the component (C) is used in an amount, based on 1 mole of aluminum contained in the component (B), of 0.01–0.25 mole, and the catalyst is prepared by a process comprising first contacting the components (B) and (C), and thereafter mixing the components (A) and (D) with the already contacted (B)–(C) mixture.

5. An olefin polymerization catalyst which comprises (I-1) a solid catalyst comprising a solid carrier, (A) a transition metal compound of the group IVB of the periodic table containing a ligand having a cyclopentadienyl skeleton, (B) an aluminoxane, and (C) at least one kind of carbonyl-containing compound selected from ketoalcohol and β-diketone, wherein said components (A), (B) and (C) are supported on said solid carrier, the component (B) is used in an amount of 10–500 in terms of atomic ratio (Al/transition metal) of aluminum (Al) contained in the component (B) to transition metal contained in the component (A), the component (C) is used in an amount, based on 1 mole of aluminum contained in the component (B), of 0.01–0.25 mole, and the solid catalyst (I-1) is prepared by a process comprising first contacting the components (B) and (C), and thereafter mixing the remaining components with the already contacted (B)–(C) mixture; and (II) (E) an organoaluminum compound.

6. An olefin polymerization catalyst which comprises (I-2) a solid catalyst comprising a solid carrier, (A) a transition metal compound of the group IVB of the periodic table containing a ligand having a cyclopentadienyl skeleton, (B) an aluminoxane, (C) at least one kind of carbonyl-containing compound selected from ketoalcohol and β-diketone, and (D) an organoaluminum compound, wherein said components (A), (B), (C) and (D) are support on said solid carrier, the component (B) is used in an amount of 10–500 in terms of atomic ratio (Al/transition metal) of aluminum (Al) contained in the component (B) to transition metal contained in the component (A), the component (C) is used in an amount, based on 1 mole of aluminum contained in the component (B), of 0.01–0.25 mole, and the solid catalyst (I-2) is prepared by a process comprising first contacting the components (B) and (C), and thereafter mixing the remaining components with the already contacted (B)–(C) mixture; and (II) (E) an organoaluminum compound.

7. An olefin polymerization catalyst which comprises:

a solid catalyst comprising a solid carrier, (A) a transition metal compound of the group IVB of the periodic table containing a ligand having a cyclopentadienyl skeleton, (B) an aluminoxane, and (C) at least one kind of carbonyl-containing compound selected from ketoalcohol and β-diketone, wherein said components (A), (B) and (C) are supported on said solid carrier, the component (B) is used in an amount of 10–500 in terms of atomic ratio (Al/transition metal) of aluminum (Al) contained in the component (B) to transition metal contained in the component (A), the component (C) is used in an amount, based on 1 mole of aluminum contained in the component (B), of 0.01–0.25 mole, and the solid catalyst is prepared by a process comprising first contacting the components (B) and (C), and thereafter mixing the remaining components with the already contacted (B)–(C) mixture; and prepolymerizing an olefin with said solid catalyst.

8. An olefin polymerization catalyst which comprises:

a solid catalyst comprising a solid carrier, (A) a transition metal compound of the group IVB of the periodic table containing a ligand having a cyclopentadienyl skeleton, (B) an aluminoxane, (C) at least one kind of carbonyl-containing compound selected from ketoalcohol and β-diketone, and (D) an organoaluminum compound, wherein said components (A), (B), (C) and (D) are support on said solid carrier, the component (B) is used in an amount of 10–500 in terms of atomic ratio (Al/transition metal) of aluminum (Al) contained in the component (B) to transition metal contained in the component (A), the component (C) is used in an amount, based on 1 mole of aluminum contained in the component (B), of 0.01–0.25 mole, and the solid catalyst is prepared by a process comprising first contacting the components (B) and (C), and thereafter mixing the remaining components with the already contacted (B)–(C) mixture; and prepolymerizing an olefin with said solid catalyst.

9. An olefin polymerization catalyst which comprises:

(I'-1) a solid catalyst comprising a solid carrier, (A) a transition metal compound of the group IVB of the periodic table containing a ligand having a cyclopentadienyl skeleton, (B) an aluminoxane, and (C) at least one kind of carbonyl-containing compound selected from ketoalcohol and β-diketone, wherein said components (A), (B) and (C) are supported on said solid carrier, the component (B) is used in an amount of 10–500 in terms-of atomic ratio (Al/transition metal) of aluminum (Al) contained in the component (B) to transition metal contained in the component (A), the component (C) is used in an amount, based on 1 mole of aluminum contained in the component (B), of 0.01–0.25 mole, and the solid catalyst (I'-1) is prepared by a process comprising first contacting the components (B) and (C), and thereafter mixing the remaining components with the already contacted (B)–(C) mixture; and a prepolymerized olefin polymer; and prepolymerizing an olefin with said solid catalyst; and (II) (E) an organoaluminum compound.

10. An olefin polymerization catalyst which comprises:

(I'-2) a solid catalyst comprising a solid carrier, (A) a transition metal compound of the group IVB of the periodic table containing a ligand having a cyclopentadienyl skeleton, (B) an aluminoxane, (C) at least one kind of carbonyl-containing compound selected from ketoalcohol and β-diketone, and (D) an organoaluminum compound, wherein said components (A), (B), (C) and (D) are support on said solid carrier, the component (B) is used in an amount of 10–500 in terms of atomic ratio (Al/transition metal) of aluminum (Al) contained in the component (B) to transition metal contained in the component (A), the component (C) is used in an amount, based on 1 mole of aluminum contained in the component (B), of 0.01–0.25 mole, and the solid catalyst (I'-2) is prepared by a process comprising first contacting the components (B) and (C), and thereafter mixing the remaining components with the already contacted (B)–(C) mixture; and prepolymerizing an olefin with said solid catalyst; and (II) (E) an organoaluminum compound.

* * * * *